(12) United States Patent
Yamamoto et al.

(10) Patent No.: US 6,407,786 B1
(45) Date of Patent: Jun. 18, 2002

(54) LIQUID CRYSTAL DISPLAY DEVICE AND METHOD FOR FABRICATING THE SAME

(75) Inventors: Akihiro Yamamoto, Osaka; Takeshi Hara, Nara; Kazuki Kobayashi, Osaka; Masumi Kubo, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 201 days.

(21) Appl. No.: 09/589,503

(22) Filed: Jun. 8, 2000

(30) Foreign Application Priority Data

Jun. 9, 1999 (JP) .......................... 11-161837

(51) Int. Cl.$^7$ ............................ G02F 1/1335

(52) U.S. Cl. ......................... 349/113; 438/30

(58) Field of Search ..................... 349/113; 438/30

(56) References Cited

U.S. PATENT DOCUMENTS

| 5,936,688 A | 8/1999 | Tsuda et al. |
| 6,330,047 B1 * | 3/2000 | Kubo et al. ............... 349/147 |
| 6,195,140 B1 * | 2/2002 | Kubo et al. ............... 349/44 |

FOREIGN PATENT DOCUMENTS

| JP | 9-292504 A | 11/1997 |
| JP | 11-7032 A | 1/1999 |

* cited by examiner

Primary Examiner—Kenneth Parker
(74) Attorney, Agent, or Firm—Nixon & Vanderhye, P.C.

(57) ABSTRACT

The liquid crystal display device of this invention includes a plurality of pixels arranged in a matrix constituting a plurality of pixel columns. Each of the plurality of pixels has a reflection region permitting reflection-mode display, the reflection region including an insulating layer having a convex/concave surface and a reflector formed on the convex/concave surface of the insulating layer. The formation of the insulating layer having the convex/concave surface includes the steps of: forming a photosensitive resin film; exposing a first region of the photosensitive region film via a first photomask (first exposure step); exposing a second region of the photosensitive region film that includes a region different from the first region via a second photomask (second exposure step); and developing the exposed photosensitive resin film, wherein the first and second exposure steps are performed so that a boundary portion defined as an overlap between the first region and the second region or a space between the first region and the second region is located to overlap with at least part of an inter-column space between adjacent pixel columns among the plurality of pixel columns.

15 Claims, 30 Drawing Sheets

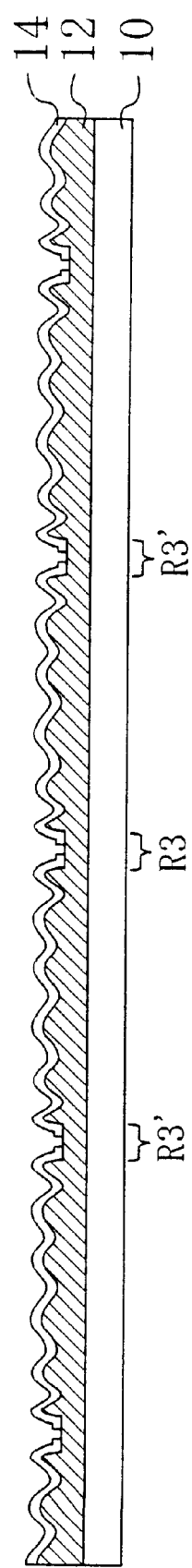

LIQUID CRYSTAL DISPLAY DEVICE AND METHOD FOR FABRICATING THE SAME

BACKGROUND OF THE INVENTION

The present invention relates to a liquid crystal display device (LCD) permitting reflection-mode display and a method for fabricating such a liquid crystal display device.

In recent years, LCDs have been broadly used for a variety of apparatuses including word processors, personal computers, TV sets, video cameras, still cameras, monitors for cars, portable office automation (OA) appliances, and portable game machines.

The LCDs do not emit light themselves, unlike cathode ray tubes (CRTs) and electro luminescence (EL) devices. Therefore, in the case of a transmission LCD using pixel electrodes (transparent electrodes) made of a transparent conductive material such as indium tin oxide (ITO), an illuminator such as a fluorescent tube (so-called backlight) is disposed at the rear of a liquid crystal panel so as to effect display using light emitted from the illuminator. Such a transmission LCD exhibits higher display quality but disadvantageously consumes larger power, compared with a reflection LCD described hereinafter. A backlight normally consumes 50% or more of the total power of the LCD.

In order to solve the above problem of the transmission LCD, there have recently been developed a reflection LCD including pixel electrodes (reflection electrodes) made of a material having a reflection characteristic such as a metal and a transmission/reflection combination type LCD including both a transparent electrode and a reflection electrode for each pixel.

The LCD permitting reflection-mode display as described above includes a reflector for reflecting ambient light. Such a reflector may be placed inside a pair of substrates constituting a liquid crystal panel (internal type) or outside the rear substrate (on the side of the substrate opposite to the side of a liquid crystal layer) (external type). The internal type is advantageous in being free from an occurrence of double image due to the thickness of the substrate (typically, glass substrate). In addition, since the internal type reflector is typically made of a metal exhibiting electrical conductivity such as aluminum, it can also be utilized as pixel electrodes (or part of pixel electrodes). This simplifies the construction.

In order to realize display with a good paper-white property in the reflection mode, the reflector should preferably have an appropriate diffuse reflection characteristic (light distribution). If the reflection plane is close to a mirror plane, it mostly returns specular reflection (mirror reflection), causing a trouble of reflecting ambient images in some cases. In reverse, if the diffuse reflection characteristic is too large, the brightness lowers. It is therefore preferable to adjust the diffuse reflection characteristic so that good paper white property and brightness can be obtained.

A method for forming an internal type reflector (or reflection electrodes) is disclosed in Japanese Laid-Open Patent Publication No. 9-292504 (corresponding U.S. Pat. No. 5,936,688) of which applicant is the same as the assignee of the present application. U.S. Pat. No. 5,936,688 is incorporated herein by reference. In the disclosed method, a photolithography process and a heat treatment process are combined as described below.

A photosensitive resin film formed on a substrate is exposed to light via a photomask having a predetermined pattern and developed, to form a convex/concave profile corresponding to the predetermined pattern. The photomask, for example, has circular light-shading spots randomly distributed therein if a positive photosensitive resin is used. The photosensitive resin film having the convex/concave profile is then heat-treated to smooth the convex/concave profile utilizing the thermal deformation of the resin. A metal film is then formed over the resultant smooth convex/concave (continuously waved) surface, and patterned to a predetermined shape corresponding to the shape of pixels thereby to form a reflector.

In the exposure of a photosensitive resin, an exposure system (i.e., aligner) such as a stepper or a large-scale one-shot (full plate) exposure system is normally used. A stepper is preferably used for forming a photosensitive resin film as described above, that is, the photosensitive resin film having the convex/concave surface that determines the surface profile of the reflector required to have an appropriate diffuse reflection characteristic. The reason is as follows. A large-scale one-shot exposure system allows a large area to be exposed to light at one time, but has large in-plane variations in light intensity and degree of collimation. This makes it difficult to obtain a reflector having a good diffuse reflection characteristic. The convex/concave profile of the surface of the photosensitive resin film substantially determines the surface profile of the reflector. Accordingly, if the convex/concave profile lacks uniformity over the entire surface, the diffuse reflection characteristic of the reflector varies, resulting in failure in uniform display. If a large-scale one-shot exposure system is employed, the resultant reflection characteristic will be such that only the center of an exposed area is bright while the periphery thereof are dark, for example. It is therefore difficult to obtain a reflector suitable for practical use.

In other words, precise profile control is required in order to form an underlying layer having a predetermined surface profile for controlling the surface profile of the reflector so that the reflector has an appropriate diffuse reflection characteristic. This is different from the case of forming contact holes that do not directly influence the display. If the exposure is made using light having large in-plane variations in intensity and degree of collimation, it is impossible to process the surface of the underlying layer into a predetermined profile.

In a stepper, light from a light source is nearly collimated via a lens system, whereby in-plane variations in light intensity and degree of collimation are made small. The stepper however has a disadvantage of exposing only a small area at one time. For example, as shown in FIG. 23A, a region 87 a stepper can expose at one time is only about 6 inches (about 152.4 mm) in diameter. This means that a region 86 allowed for formation of a convex/concave profile is a square of about 6 inches in diagonal at maximum. In order to expose an area larger than 6 inches in diameter using the stepper, division exposure as shown in FIG. 23B is required, where an area is divided into sub-regions for individual exposure. More specifically, a first sub-region 88a is exposed to light in the first exposure step (an exposure range 89a; an exposure center 90a), and thereafter a second sub-region 88b is exposed to light in the second exposure step (an exposure range 89b; an exposure center 90b).

However, the exposure using a stepper still exhibits an in-plane variation of light (image distortion; while the degree of collimation of a light ray is high in the center, it is low in the periphery). The resultant light pattern obtained using the stepper is distorted from an ideal pattern that would be obtained if a photomask is illuminated with completely collimated light (the pattern of light-transmitting spots of the photomask). The distortion is greater in a portion closer to the periphery. For example, if a mask for illuminating a plurality of circular spots is used, circles are obtained in the center of an exposed area but ellipses instead of circles are formed in the periphery. In the case of one-shot exposure, when a reflector is formed on the resultant convex/concave surface, the reflection characteristic changes as the convex/concave pattern changes from circles to ellipses from the center toward the periphery of the exposed area. However, this change in reflection characteristic is continuous and thus hardly recognized as a change in display quality.

In the case of division exposure, however, the following problem arises. When a reflector is formed on the convex/concave surface obtained by the division exposure, the reflection characteristic of the reflector changes discontinuously, and thus the seam of division exposure is observed as a change in display quality. This is because, at each seam of division exposure, an ellipse having one major axis direction (direction of distortion of the convex/concave pattern) is adjacent to an ellipse having another major axis direction. That is, when a reflector is formed on a photosensitive resin film subjected to division exposure, a seam (boundary) 91 shown in FIG. 23B is revealed between the first and second exposure steps.

The distribution of the degree of collimation of light generated by a stepper can be made uniform to some extent by correcting lens distortion. However, the convex/concave profile changes with a minute change in light intensity and degree of collimation, and the reflection characteristic largely varies with a small change in convex/concave profile. It is therefore difficult to form a reflector having a practical reflection characteristic employing a division exposure method even by correcting lens distortion.

The in-plane variations in light intensity and degree of collimation generated by use of the stepper can be reduced by another way. That is, the regions 88a and 88b exposed in one exposure step (by one shot) may be made smaller. However, this increases the number of exposure steps and accompanying alignment steps, resulting in markedly lowering the production efficiency. In addition, improvement of the degree of collimation is limited in this method.

Another problem of division exposure is as follows. The sub-regions exposed during the respective exposure steps somewhat overlap with each other in consideration of possible displacement of exposure regions (photomask alignment error).

Hereinafter, each overlap portion between the exposed regions by division exposure is referred to as a seam portion (or a boundary portion).

For example, assume that photomasks 82a and 82b shown in FIG. 24 are used to perform division exposure and a seam portion 1 is formed. The portion of a photosensitive resin 10 film constituting the seam portion 1 is twice exposed to light transmitted through light-transmitting spots of the photomasks 82a and 82b in the two exposure steps. As a result, after development, the surface profile of the seam portion 1 of the photosensitive resin film is completely different from that of the other portion of the photosensitive resin film. The reflector to be formed on the thus-formed photosensitive resin film will have a reflection characteristic that varies between the portions located above the seam portion 1 and the other portions. In particular, if a seam portion 91 is formed in a pixel region as shown in FIG. 25, the change in reflection characteristic at the seam portion 91 is more likely to be observed, thereby markedly lowering the display quality.

A method for making the seam portion less visible is disclosed in Japanese Laid-Open Patent Publication No. 11-7032. In this disclosure, a photosensitive resin is subjected to division exposure so that at least one pixel column that constitutes a seam portion includes pixels subjected to different exposure steps (that is, the seam portion is formed to be zigzagged every pixel). This publication also discloses a method of division exposure where each pixel of at least one pixel column constituting a seam portion is subjected to different exposure steps (that is, the seam portion is formed inside the pixel). However, in the zigzagging method, high-precision alignment of a photomask is required both in the row and column directions. This makes it difficult to obtain satisfactory productivity. In the method of forming the seam portion inside a pixel, the reflection characteristic at the seam portion largely changes with a minute deviation in alignment of the photomask. High-precision alignment is therefore required to make the seam portion less visible. This also makes it difficult to obtain satisfactory productivity.

SUMMARY OF THE INVENTION

An object of the present invention is providing a liquid crystal display device permitting reflection-mode display that has good productivity and minimizes lowering in display quality at seam portions generated by division exposure, and a method for fabricating such a liquid crystal display device.

The method for fabricating a liquid crystal display device including a plurality of pixels arranged in a matrix constituting a plurality of pixel columns, each of the plurality of pixels having a reflection region permitting reflection-mode display, the reflection region including an insulating layer having a convex/concave surface and a reflector formed on the convex/concave surface of the insulating layer includes the step of forming the insulating layer having the convex/concave surface. The step of forming the insulating layer includes the steps of: forming a photosensitive resin film; exposing a first region of the photosensitive region film via a first photomask (first exposure step); exposing a second region of the photosensitive region film that includes a region different from the first region via a second photomask (second exposure step); and developing the exposed photosensitive resin film, wherein the first and second exposure steps are performed so that a boundary portion defined as an overlap between the first region and the second region or a space between the first region and the second region is located to overlap with at least part of an inter-column space between adjacent pixel columns among the plurality of pixel columns.

The first and second exposure steps may be performed so that the boundary portion overlaps with the inter-column space and part of the reflection regions of the pixels on both sides of the inter-column space. Alternatively, the first and second exposure steps may be performed so that the boundary portion is located to be within the range of the inter-column space.

In the first and second exposure steps, a pattern via which the boundary portion of the photosensitive resin film is exposed to light is preferably be the same as a pattern via which portions of the photosensitive resin film corresponding to the inter-column spaces other than the inter-column space corresponding to the boundary portion.

In the first and second exposure steps, the portions of the photosensitive resin film corresponding to the inter-column spaces may be exposed to light having a substantially uniform intensity distribution. Alternatively, in the first and second exposure steps, the boundary portion of the photosensitive resin film and the portions of the photosensitive resin film corresponding to the inter-column spaces other than the inter-column space corresponding to the boundary portion may substantially not be exposed to light.

The portions of the photosensitive resin film corresponding to all the inter-column spaces formed by the plurality of pixels may be removed.

Preferably, the first and second exposure steps are performed so that the boundary portion of the photosensitive resin film is not double exposed to light.

The liquid crystal display device of the present invention includes a plurality of pixels arranged in a matrix constituting a plurality of pixel columns, each of the plurality of pixels having a reflection region permitting reflection-mode display, the reflection region including an insulating layer having a convex/concave surface and a reflector formed on the convex/concave surface of the insulating layer, wherein the insulating layer includes: a first region allowing the overlying reflector to exhibit a first reflection characteristic; a second region allowing the overlying reflector to exhibit a second reflection characteristic; and a third region formed between the first region and the second region, and the third region is located to overlap with at least part of an inter-column space between adjacent pixel columns among the plurality of pixel columns.

The third region may overlap with the inter-column space and part of the reflection regions of the pixels on both sides of the inter-column space. Alternatively, the third region may be located to be within the range of the inter-column space.

Preferably, a portion of the insulating layer corresponding to the at least part of the inter-column space overlapping with the third region has the same convex/concave profile as a portion of the insulating layer corresponding to the inter-column space that does not overlap with the third region.

The third region of the insulating layer may have a substantially flat surface.

At least part of the insulating layer corresponding to all the inter-column spaces formed by the plurality of pixels may have been removed.

Preferably, the device further includes: switching elements provided for the respective plurality of pixels; scanning lines for applying a scanning signal to the switching elements; and signal lines provided to intersect with the scanning lines for applying a display signal to the switching elements, wherein the scanning lines and the signal lines run between the plurality of pixels.

BRIEF DESCRIPTION OF THE DRAWINGS

FIGS. 6A and 6B are a plan view and a cross-sectional view, respectively, of yet another LCD of the embodiment of the present invention.

DESCRIPTION OF THE PREFERRED EMBODIMENTS

Hereinafter, preferred embodiments of the liquid crystal display device and the fabrication method thereof according to the present invention will be described with reference to the relevant drawings. It should be noted that the present invention is not restricted to the following embodiments.

Figure 1A:
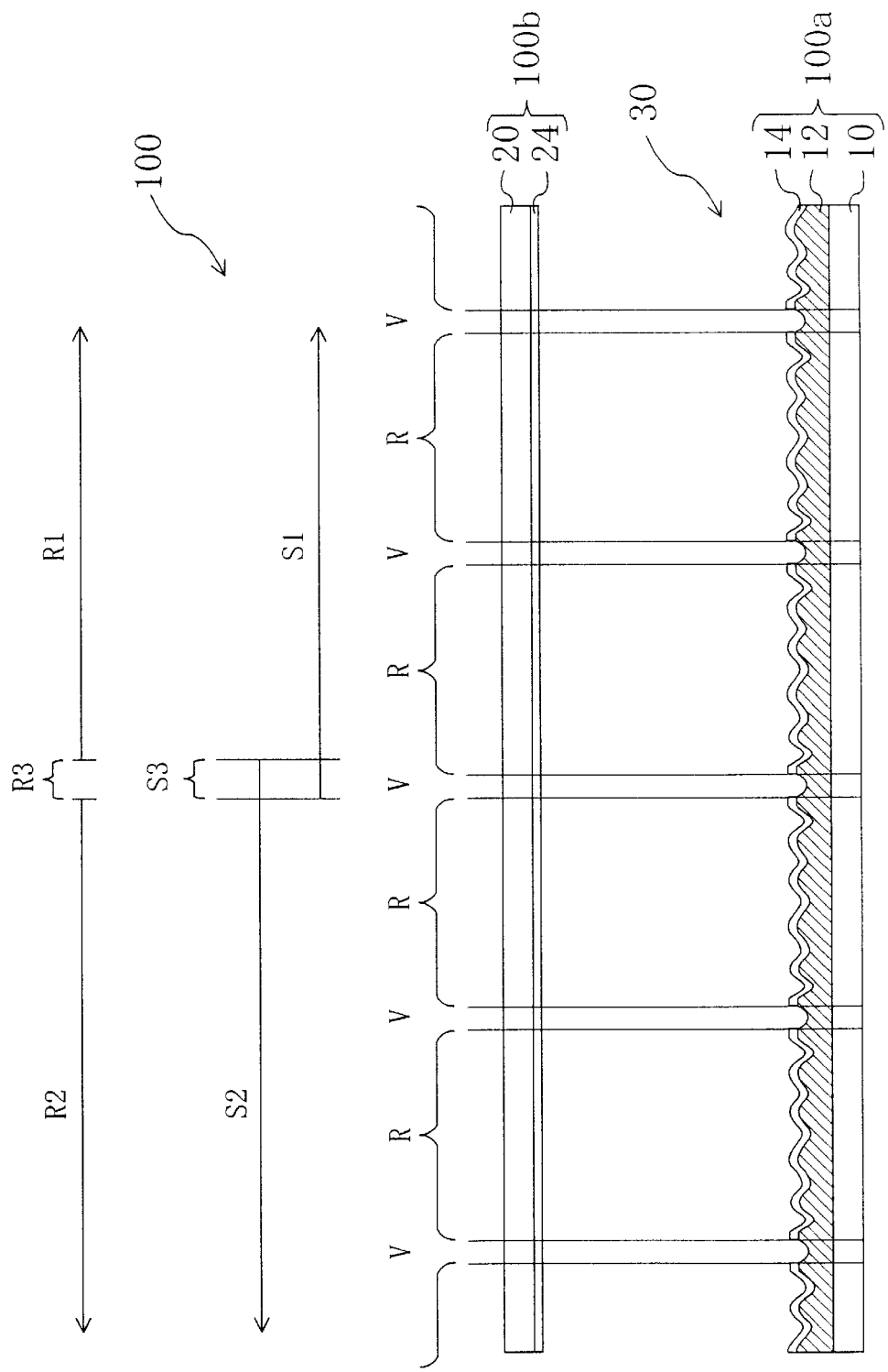
FIGS. 1A and 1B are a schematic cross-sectional view and a plan view, respectively, of an LCD of an embodiment of the present invention.
Figure 1B:
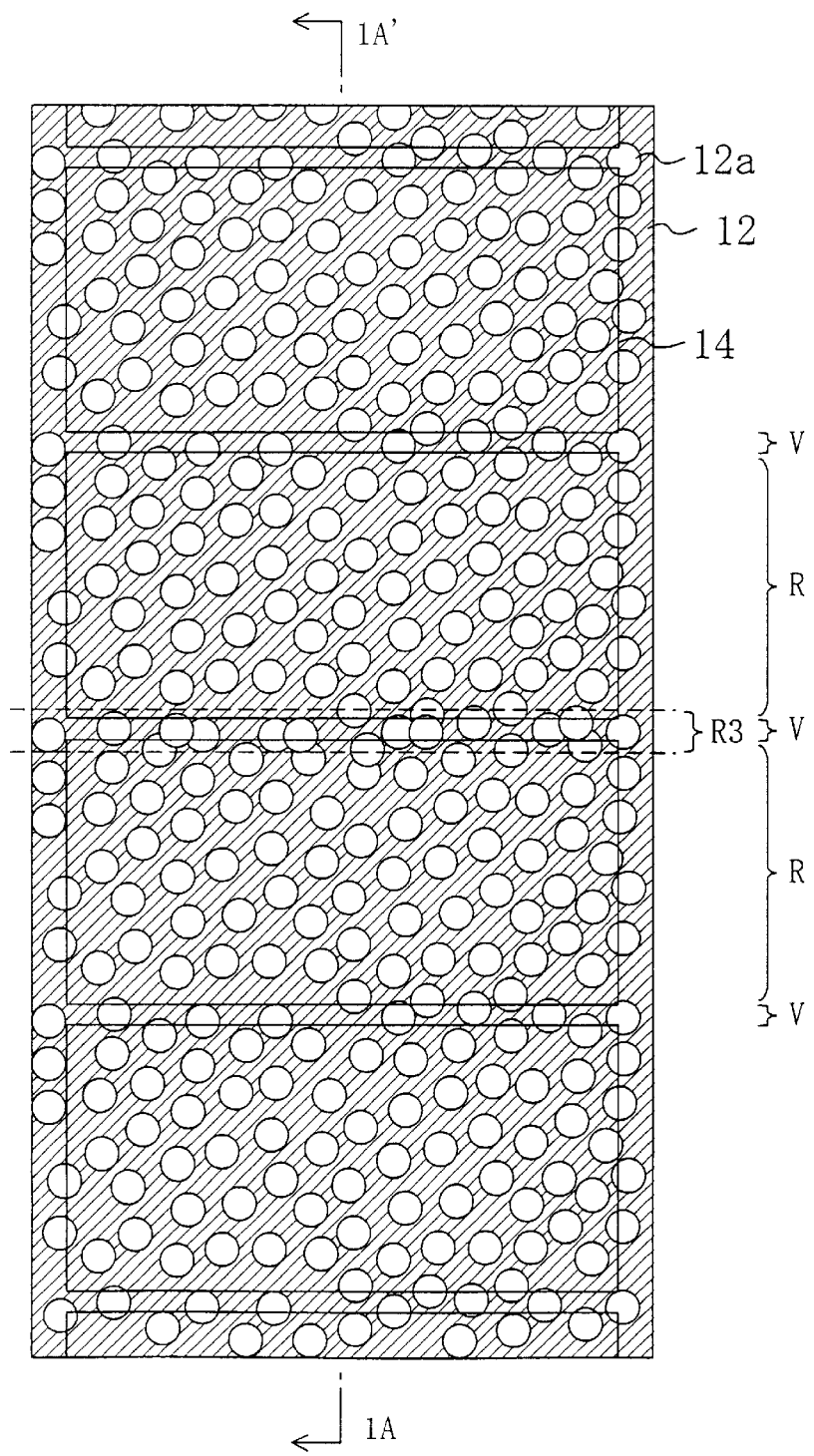

FIGS. 1A and 1B illustrate a liquid crystal display device (LCD) 100 of an embodiment of the present invention: FIG.

1B is a plan view and FIG. 1A is a cross-sectional view taken along line 1A–1A' of FIG. 1B.

The LCD 100 is a reflection LCD including reflection regions R for allowing pixels arranged in a matrix to effect reflection-mode display. In FIGS. 1A and 1B, only four pixels (reflection regions R) belonging to a common row are shown among a plurality of pixels arranged in a matrix. The four pixels belong to different pixel columns from one another. Herein, the "column" is defined as parallel with the signal lines (source signal lines) whereas the "row" is defined as parallel with the scanning lines (gate signal lines). Alternatively, the column and the row may be reversed.

The present invention is broadly applicable to any LCDs having reflection regions permitting reflection-mode display (for example, reflection LCDs and combination type LCDs) irrespective of the driving method and the display mode of the LCDs. The reflection LCD 100 may be an active matrix type LCD or a simple matrix type LCD.

The reflection LCD 100 includes a first substrate 100a, a second substrate 100b, and a liquid crystal layer 30 interposed between these substrates. The first substrate 100a includes a transparent substrate 10, an insulating layer 12 formed on the transparent substrate 10, and reflectors 14 formed on the insulating layer 12. The second substrate 100b includes a transparent substrate 20 and a transparent electrode 24 formed on the transparent substrate 20. The first substrate 100a and/or the second substrate 100b are provided with alignment layers and color filters (both not shown) as required.

In the illustrated example, the reflectors 14 function as electrodes for applying a voltage to the liquid crystal layer 30 (hereinafter, therefore, referred to as the reflection electrodes 14). Alternatively, electrodes may be formed separately from the reflectors. The reflection electrodes 14 are pixel electrodes in an active matrix type LCD and stripe-shaped signal electrodes, for example, in a simple matrix type LCD. The reflection electrodes 14 and portions of the transparent electrode 24 opposing each other via the liquid crystal layer 30 define respective pixels. Herein, the "pixel" is used to represent the region of the display device corresponding to the minimum display unit. The pixel of the reflection LCD is composed of only the reflection region R.

The reflection electrodes 14 have a convex/concave surface (reflection surface) having an appropriate diffuse reflection characteristic. The convex/concave surface profile of the reflection electrodes 14 is substantially determined by the convex/concave surface profile of the underlying insulating layer 12.

The convex/concave surface profile of the insulating layer 12 is formed by a photolithography process (including exposure and development steps) using a photosensitive resin. Circles indicated by the reference numeral 12a in FIG. 1B schematically illustrate convex portions of the insulating layer 12. The convex portions 12a, which are typically circles as is viewed in the direction normal to the display plane, are randomly arranged in the plane. Such convex portions 12a represent spots exposed or not exposed to light in the exposure step and correspond to light-transmitting spots or light-shading spots of a photomask (not shown). Whether the convex portions 12a correspond to exposed spots or non-exposed spots depends on whether the photosensitive resin used for the formation of the insulating layer 12 is negative or positive.

For precise control of the convex/concave profile, the display region of the reflection LCD 100 is divisionally exposed to light in different exposure steps (division exposure). More specifically, referring to FIG. 1A, a first section S1 is exposed in a first exposure step and a second section S2 is exposed in a second exposure step. The first section S1 and the second section S2 are exposed to light so that they partly overlap with each other, forming a boundary portion S3 (corresponding to the seam portion), in consideration of an alignment margin for the photomask.

The exposure steps are performed so that the boundary portion S3 as the overlap portion of the first and second sections S1 and S2 is located to overlap with at least part of a space between adjacent pixel columns (an inter-column space V shown in FIG. 1A). In the example illustrated in FIGS. 1A and 1B, the boundary portion S3 is shown to over-lap lap with the inter-column space V and part of the reflection regions R on both sides of the inter-column space V. Alternatively, the exposure steps may be performed so that the boundary portion S3 is located within the range of the inter-column space V.

Since the insulating layer 12 is subjected to the division exposure as described above, the convex/concave surface of the insulating layer 12 in the first section S1 subjected to the first exposure step is slightly different from that in the second section S2 subjected to the second exposure step. It is substantially impossible to obtain a completely identical surface profile even if the same photomask is used for the first and second exposure steps since the two steps are performed independently from each other. Therefore, the reflection electrodes 14 formed in the first and second sections S1 and S2 have different diffuse reflection characteristics. The difference in the diffuse reflection characteristic is often recognized as difference in display quality.

Moreover, the two exposure steps are performed so that the first and second sections SI and S2 overlap with each other. Therefore, the surface profile of the insulating layer 12 in the boundary portion S3 is different from the surface profiles of the insulating layer 12 in the first and second sections S1 and S2 (excluding the portions of these sections constituting the boundary portion S3). The difference in the surface profile between the boundary portion S3 and any of the first and second sections S1 and S2 is greater than that between the first and second sections S1 and S2 unless the surface profile in the boundary portion is formed using a set of photomasks having a different pattern for the boundary portion (this will be described hereinafter with reference to FIGS. 8 and 9).

Thus, the surface of the insulating layer 12 formed by the division exposure described above includes three regions having different surface profiles from one another due to the different exposure steps. The three regions are a first region R1 subjected to only the first exposure step, a second region R2 subjected to only the second exposure step, and a third region R3 subjected to the first and second exposure steps.

In the division exposure described above where the exposure is done so that the first and second sections S1 and S2 overlap with each other, the third region R3 between the first and second regions R1 and R2 is subjected to both the first and second exposure steps. Alternatively, the exposure may be done so that the first and second sections S1 and S2 do not overlap with each other but spaced apart from each other with a gap therebetween. Therefore, the boundary portion S3 in the exposure is defined as the overlap between the first and second sections S1 and S2 or the gap between the first and second sections S1 and S2. The region of the insulating layer 12 corresponding to the boundary portion S3 determined in the exposure is the third region R3. As shown in FIGS. 1A and 1B, the third region R3 in the reflection LCD 100 is placed to overlap with the inter-column space V and part of the reflection regions R (identical to the pixels in the illustrated example) on both sides of the inter-column space V. The third region R3 may otherwise be placed within the range of the inter-column space V as described above.

Thus, in the reflection LCD 100 of this embodiment, the third region R3 of the insulating layer 12 formed by the division exposure is located to overlap with at least part of the inter-column space V. The inter-column space v includes no reflection electrode 14. Therefore, the third region R3 that has a surface profile different from those of the first and second regions R1 and R2 only contributes to display at a smaller proportion, compared with the construction where the third region R3 is located to overlap with the reflection region R. As a result, in the reflection LCD 100 of this embodiment, the seam portion formed due to the division exposure is made less visible.

Figure 2:
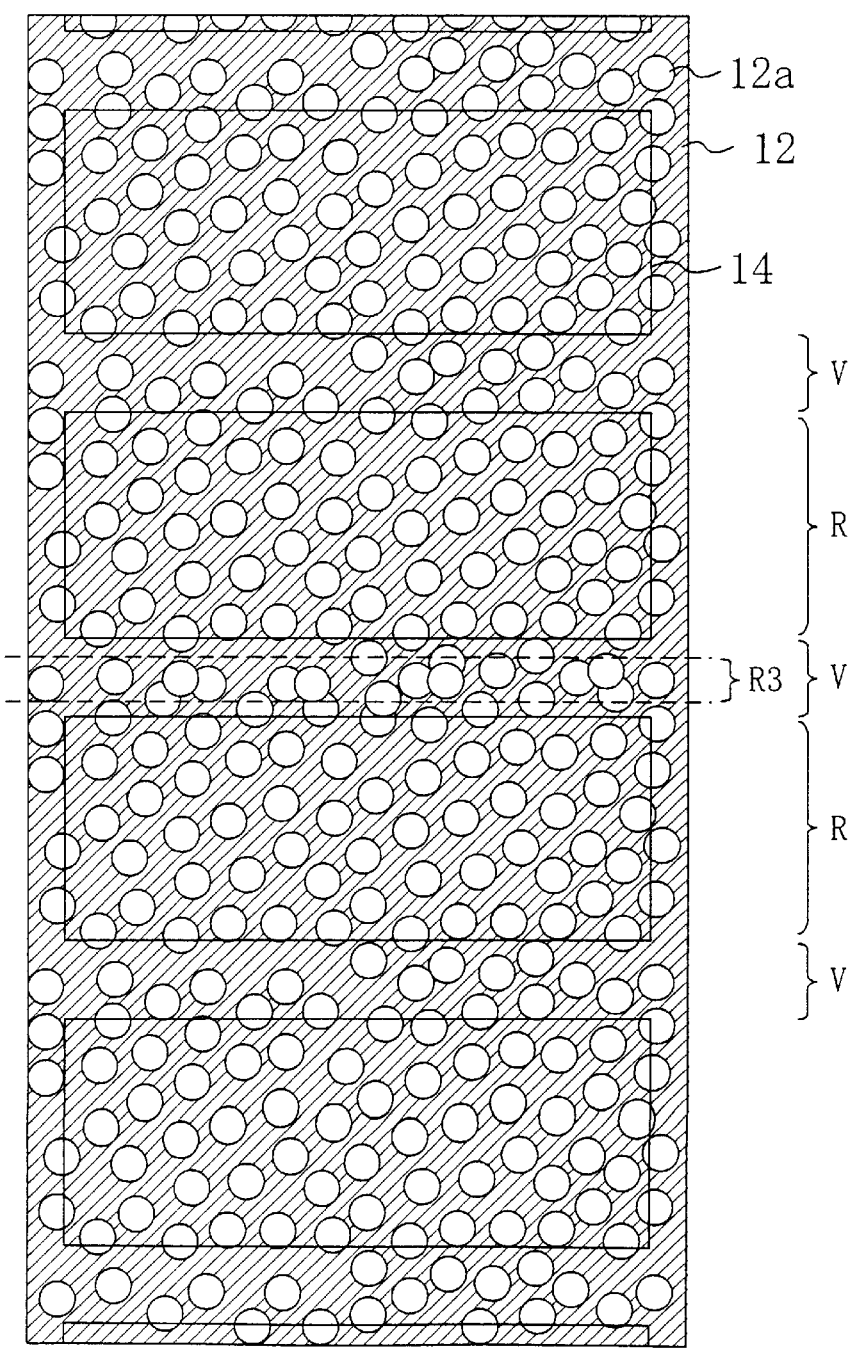
FIG. 2 is a plan view of another LCD of the embodiment of the present invention.

For example, in the construction as shown in FIGS. 1A and 1B where the third region R3 is located to overlap with the inter-column space V and part of the reflection regions R on both sides of the inter-column space V, only the portion of the reflection electrodes 14 located above the third region R3 of the insulating layer 12 contributes to display. The seam portion is therefore less visible. If the inter-column space V is constructed to be wider than the third region R3 as shown in FIG. 2, the third region R3 does not overlap with the reflection electrode 14 and thus does not contribute to display at all. This further makes the seam portion less visible.

The width of the inter-column space V and that of the third region R3 are appropriately determined depending on the specification of the LCD to be fabricated and the alignment precision of the exposure system (for example, a stepper). In general, the area of the reflection electrode 14 is preferably wider for improvement of the display brightness. Preferably, therefore, the construction shown in FIGS. 1A and 1B is adopted, and the overlap width of the third region R3 with the reflection regions R is determined so that the seam portion is not visible.

When the third region R3 overlaps with the reflection region R as described above, the construction shown in FIG. 3 may be adopted. That is, the insulating layer 12 is patterned so that all the portions of the reflection electrodes 14 adjacent to the inter-column spaces V have substantially the same diffuse reflection characteristic as the portions of the reflection electrodes 14 overlapping with the third region R3. The width of the former portions is made substantially the same as that of the latter portions. This further makes the seam portion less visible. Such portions of the insulating layer 12 adjacent to the inter-column spaces V other than the inter-column space V overlapping with the third region R3, which have substantially the same surface profile as that of the third region R3, are hereinafter referred to as virtual third regions (virtual seam portions) R3'. The seam portion will be less visible if the virtual third regions R3' have substantially the same width (area) and surface profile (diffuse reflection characteristic) as the third region R3.

Practically, however, it is difficult to provide substantially the same surface profile for the third region R3 of the insulating layer 12 subjected to the double exposure steps and for the virtual third regions R3' thereof subjected to a single exposure step unless a set of photomasks (see FIGS. 8 and 9) having a different pattern for the boundary portion is provided. Moreover, in the case of half exposure, it is substantially impossible to provide the same surface profile for the third region R3 and the virtual third regions R3' of the insulating layer 12 by adjusting the pattern of the photomask. The half exposure is a process of exposure where a photosensitive resin is illuminated with light of quantity not enough to remove the exposed or non-exposed portion completely, to keep part of an exposed or non-exposed portion of the photosensitive resin unremoved.

Figure 4A:
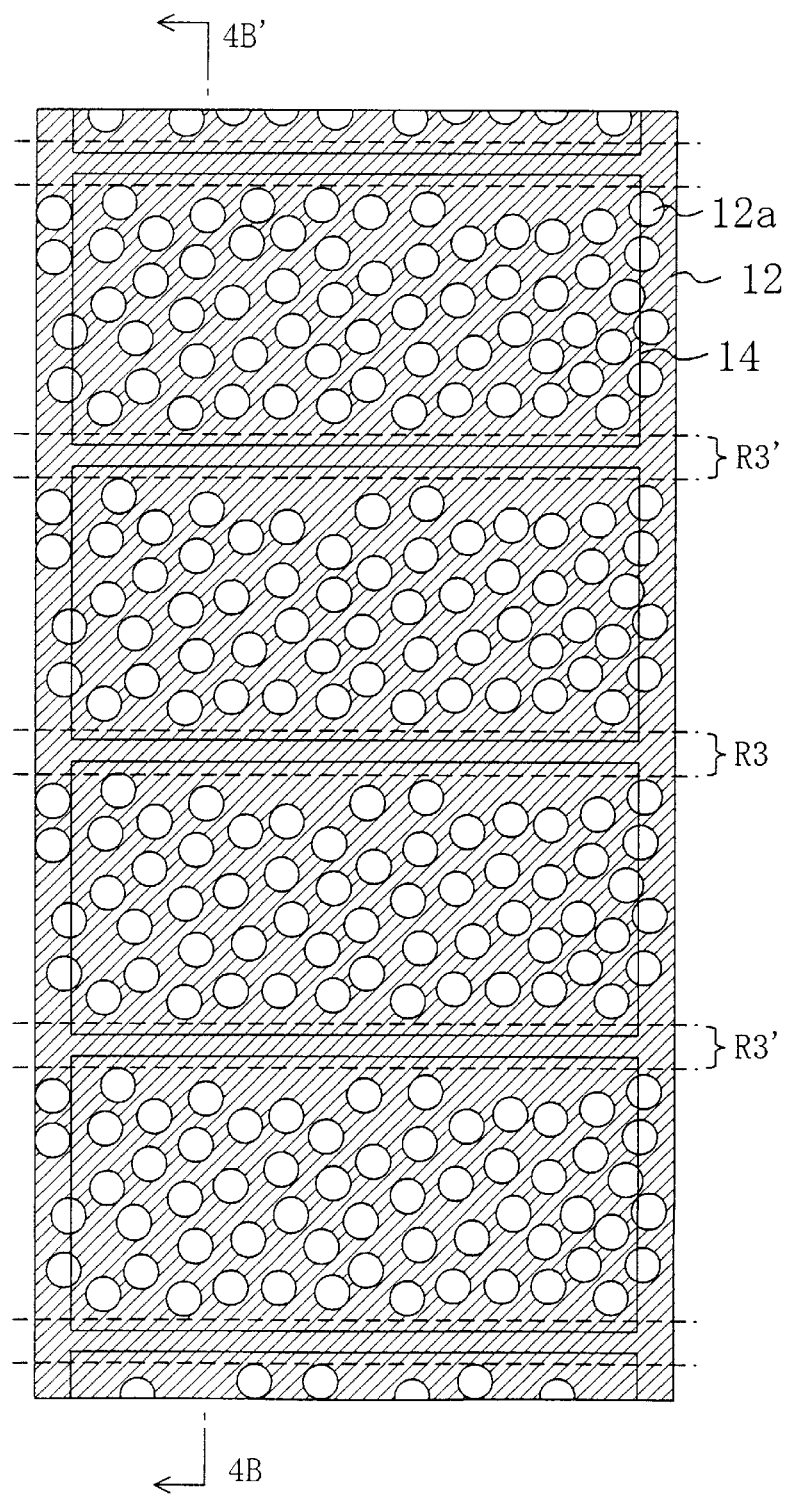
FIGS. 4A and 4B are a plan view and a cross-sectional view, respectively, of yet another LCD of the embodiment of the present invention.
Figure 4B:
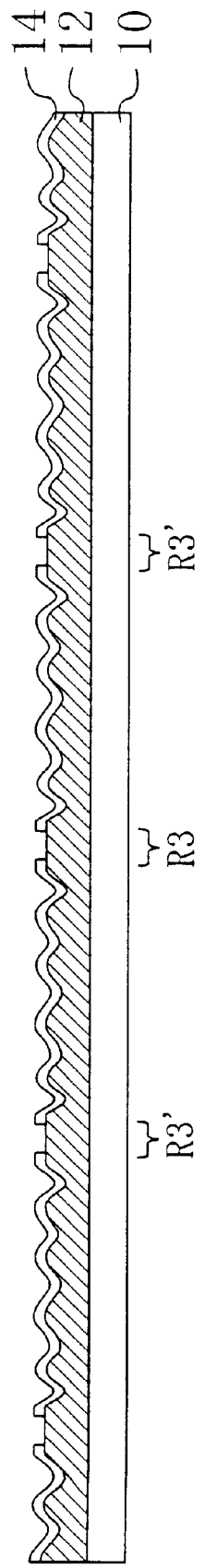

In order to solve the above problem, as shown in FIGS. 4A and 4B, no convex/concave profile may be formed on S the surfaces of the third region R3 and the virtual third regions R3'=0 of the insulating layer 12 (that is, the regions corresponding to all the inter-column spaces V and all the portions of the reflection electrodes 14 adjacent to the inter-column spaces V). Instead, the surfaces of such regions may be made flat. This configuration is hardly influenced by a variation in exposure conditions, and thus makes it possible to provide substantially the same surface profile for the third region R3 and the virtual third regions R3' of the insulating layer 12. In other words, all the portions of the reflection electrodes 14 adjacent to the inter-column spaces V have substantially the same reflection characteristic as that possessed by the portions of the reflection electrodes 14 formed on the third regions R3. This makes the seam portion less visible.

The portions of the reflection electrodes 14 formed on the flat surfaces return specular reflection (mirror reflection). That is, light reflected from these portions contributes to display at a smaller proportion than light reflected from the convex/concave surface. This reduces the difference in reflection characteristic between the portions of the reflection electrodes 14 adjacent to the inter-column spaces V and the portions of the reflection electrodes 14 formed on the third region R3. As a result, the seam portion is less visible than the case of the convex/concave surface. The flat profile can be obtained in the following manner, for example. If a positive photosensitive resin is used as the material of the insulating layer 12, the exposure is done so that the portions to be made flat are not exposed. If a negative photosensitive resin is used, the exposure is done so that the portions to be made flat are sufficiently exposed to light having substantially a uniform intensity distribution (complete exposure).

Figure 5A:
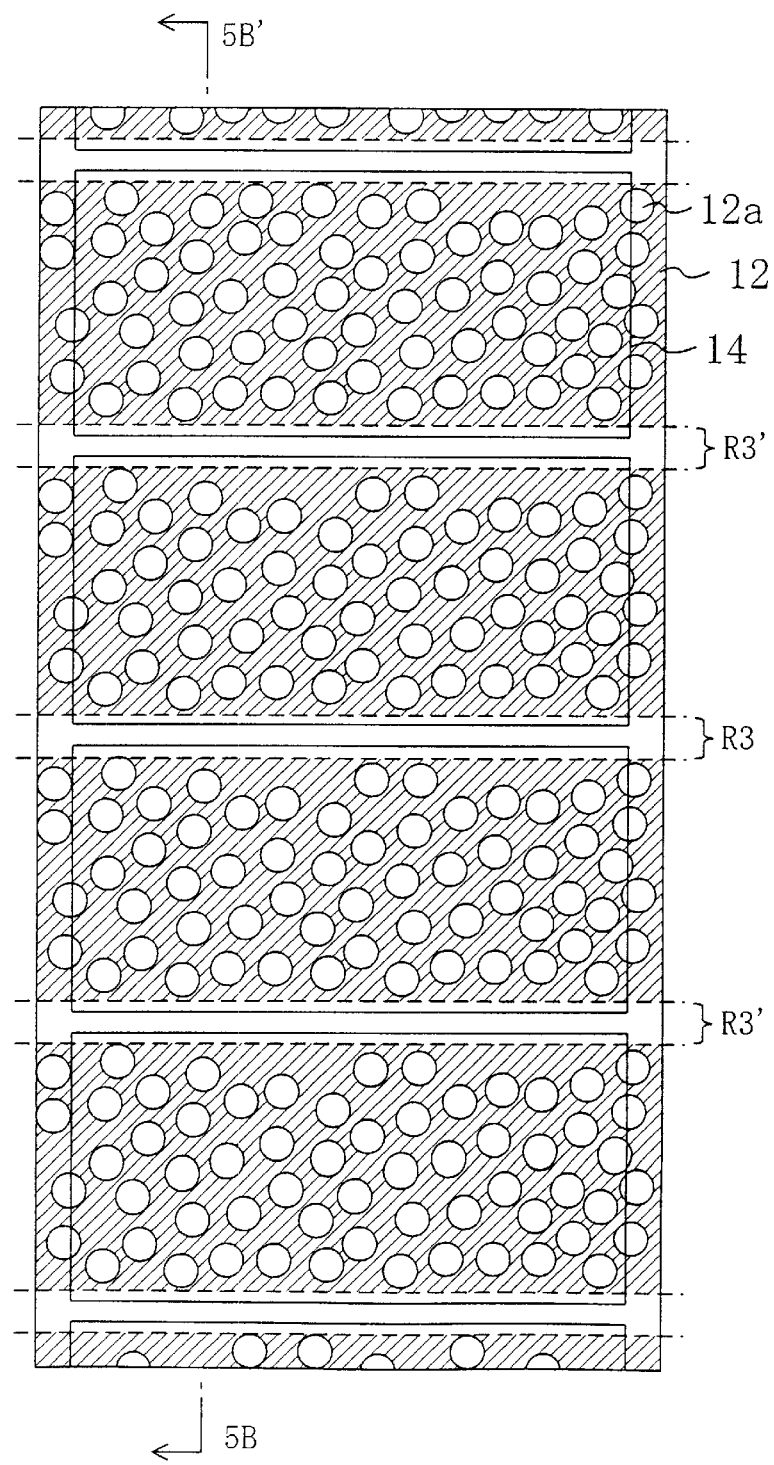
FIGS. 5A and 5B are a plan view and a cross-sectional view, respectively, of yet another LCD of the embodiment of the present invention.
Figure 5B:
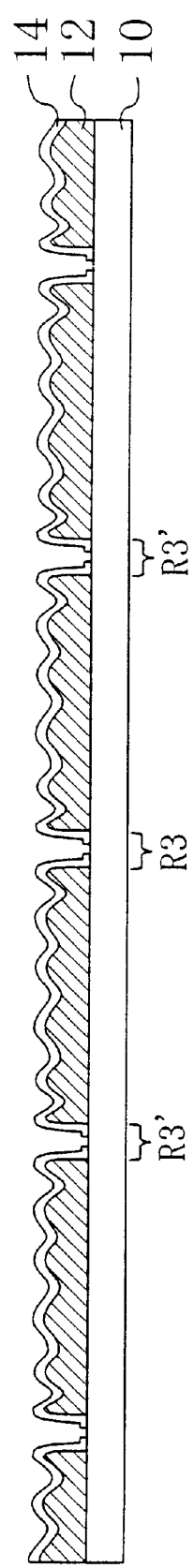

Alternatively, as shown in FIGS. 5A and 5B, the third region R3 and the virtual third regions R3' of the insulating layer 12 may be removed, to expose flat surfaces underlying the insulating layer 12, so as to form the reflection electrodes 14 on the flat surfaces. This construction also makes the seam portion less visible as in the construction shown in FIGS. 4A and 4B. This flat profile is obtained in the following manner, for example. If a negative photosensitive resin is used as the material of the insulating layer 12, the exposure is done so that the portions of the photosensitive resin film to be removed are not exposed. If a positive photosensitive resin is used, the exposure is done so that the portions of the photosensitive resin film to be removed are sufficiently exposed to light having substantially a uniform intensity distribution (complete exposure).

Figure 6A:
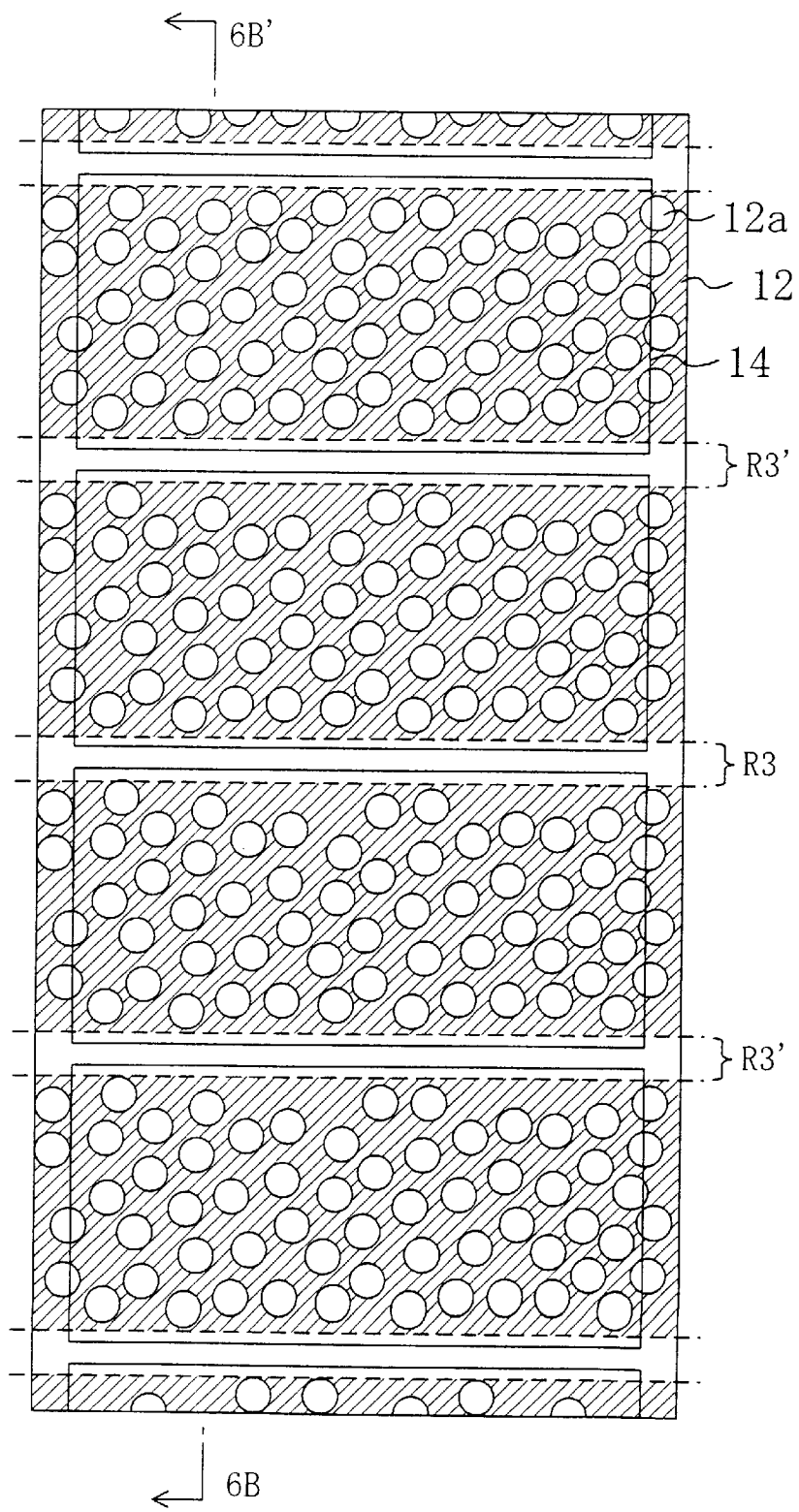

Further, as shown in FIGS. 6A and 6B, the third region R3 and the virtual third regions R3' of the insulating layer 12 may be removed partly (in the thickness direction), to make flat the surfaces of these regions of the insulating layer 12. This construction is obtained by subjecting the photosensitive resin film (whether negative or positive) to incomplete exposure (half exposure). Preferably, the photomask should be patterned so that the portion of the photosensitive resin film to be the third region R3 is not double exposed.

The construction shown in FIGS. 5A and 5B and that shown in FIGS. 6A and 6B have an advantage over the construction shown in FIGS. 4A and 4B as follows.

In the construction shown in FIGS. 4A and 4B, the thickness of the insulating layer 12 in the third region R3 and the virtual third regions R3' is larger than that in the other regions. This results in that the liquid crystal layer 30 located above the third region R3 and the virtual third regions R3' is thinner than that above the other regions. If the liquid crystal layer 30 is thin, the reflection electrode 14 and the transparent electrode 24 opposing each other via the liquid crystal layer 30 are likely to be short-circuited with each other via existence of a conductive foreign substance. On the contrary, in the construction where at least part (in the thickness direction) of the insulating layer 12 has been removed in the third region R3 and the virtual third regions R3' (see FIGS. 5B and 6B), the liquid crystal layer 30 located above these regions is thicker than that above the other regions. This minimizes short-circuiting between the reflection electrode 14 and the transparent electrode 24.

In particular, the constructions shown in FIGS. 5B and 6B are advantageous for the LCD adopting the following structure. That is, a stripe-shaped color filter layer (typically, composed of red, green, and blue layers) is formed on the counter substrate 100b so as to correspond to the pixel columns, and adjacent color layers are superimposed on each other to light-shade the spaces between the pixel columns. This superimposition of the color layers reduces the thickness of the liquid crystal layer 30 in the inter-column spaces V compared with that in the other regions. Therefore, if the construction shown in FIG. 4B is adopted for the LCD having the counter substrate 100b of the above structure, short circuit between the reflection electrode 14 and the transparent electrode 24 is more likely to be generated. If the construction shown in FIGS. 5B or 6B is adopted, however, generation of short circuit can be effectively minimized or eliminated.

Figure 7:
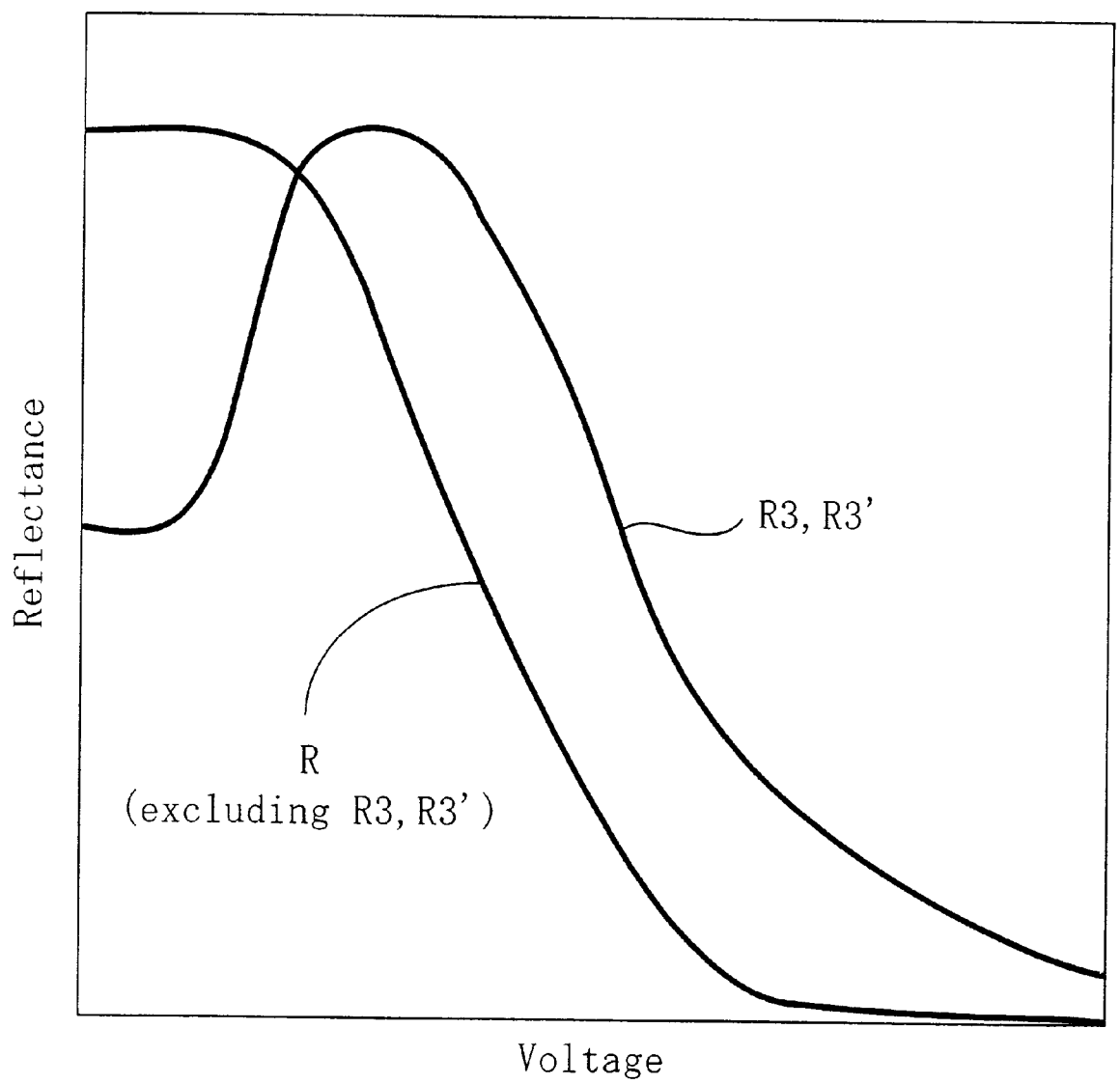
FIG. 7 is a graph showing the voltage-reflectance characteristic of the LCD of the embodiment of the present invention.

The construction where at least part (preferably all) of the insulating layer 12 is removed in the third region R3 and the virtual third regions R3' has another advantage as follows. In the case of an ECB-mode LCD where a horizontally oriented liquid crystal layer (that is, liquid crystal molecules are oriented parallel to the substrate surface when no voltage is applied) is used to effect normally-white mode display, a thicker portion of the liquid crystal layer 30 has an optical path length different from the other portions thereof. Therefore, as schematically shown in FIG. 7, the reflectance of the LCD at the third region R3 and the virtual third regions R3' is different from that at the reflection regions R (excluding the portions thereof constituting the third region R3 and the virtual third regions R3'). As is apparent from the voltage-reflectance (brightness of LCD) curves in FIG. 7, the reflectance at the third region R3 and the virtual third regions R3' is lower than that at the reflection regions R when no voltage is applied, indicating that the seam portion is less visible. It should be noted however that FIG. 7 is a schematic representation of the voltage-reflectance characteristic of the reflection LCD. The actual voltage-reflectance characteristic of the reflection LCD varies depending on the liquid crystal material used, the thickness of the liquid crystal layer, the thickness of the insulating layer, and the like.

Figure 3:
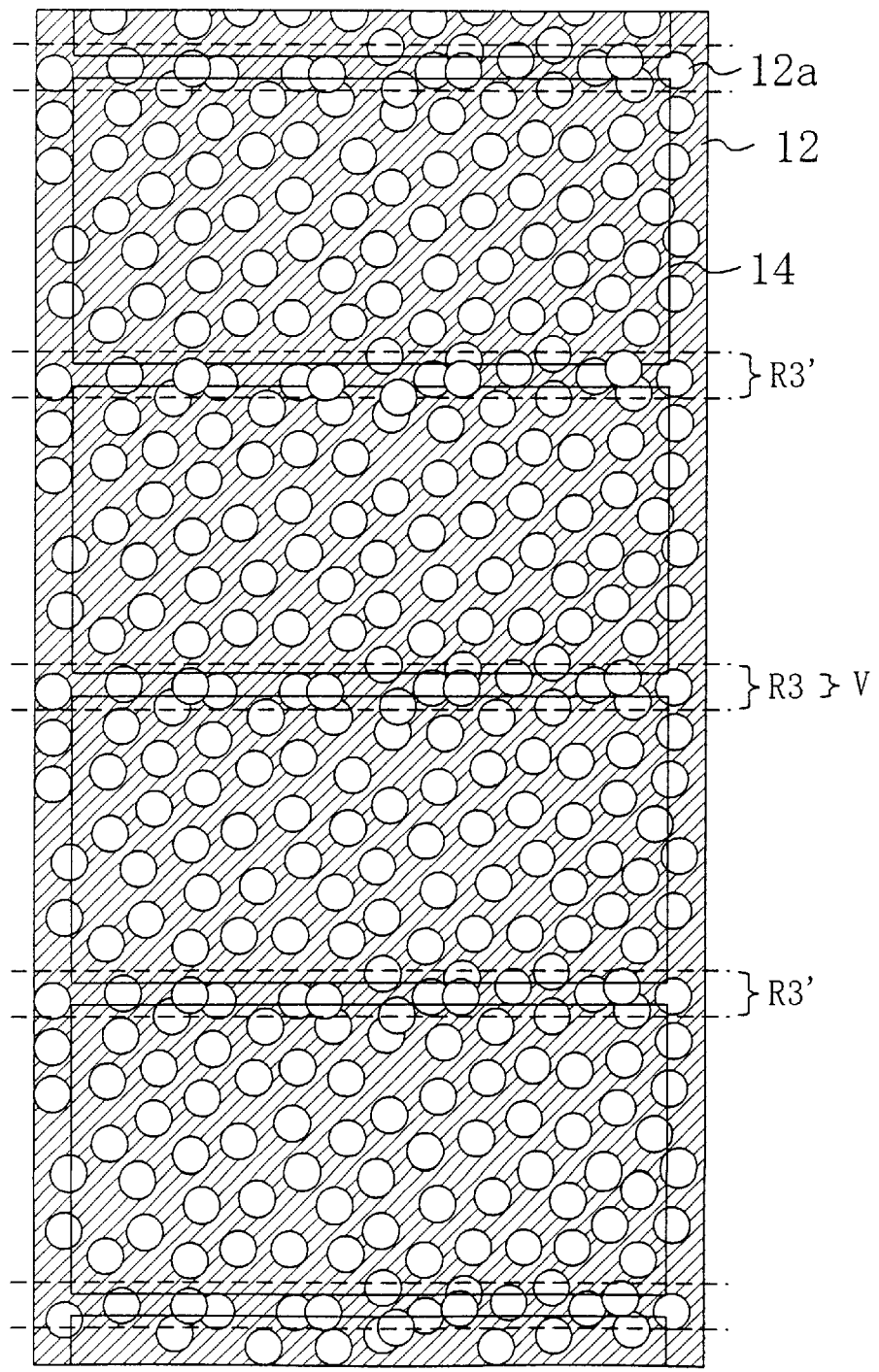
FIG. 3 is a plan view of yet another LCD of the embodiment of the present invention.

As described above, various constructions can be used to make the seam portion less visible. In the constructions described above where the third region R3 is made wider than the inter-column space V, the inter-column space V may be made as narrow as possible to secure a larger area of the reflection electrode 14 for realizing bright display. In particular, brighter display is obtained by providing a concave/convex profile for the surface of the reflection electrode 14 on the third region R3 as shown in FIG. 1B, compared with, for example, the construction shown in FIG. 4A where the reflection electrode 14 is formed on the flat surface. However, as described above, in the construction shown in FIG. 1B, the surface profile of the third region R3 of the insulating layer 12 is different from that of the other regions thereof. Even if the virtual third regions R3' are provided as shown in FIG. 3, the surface profile of the third region R3 of the insulating layer 12 is different from that of the virtual third regions R3'. This is because only the third region R3 is subjected to two exposure steps.

Figure 8:
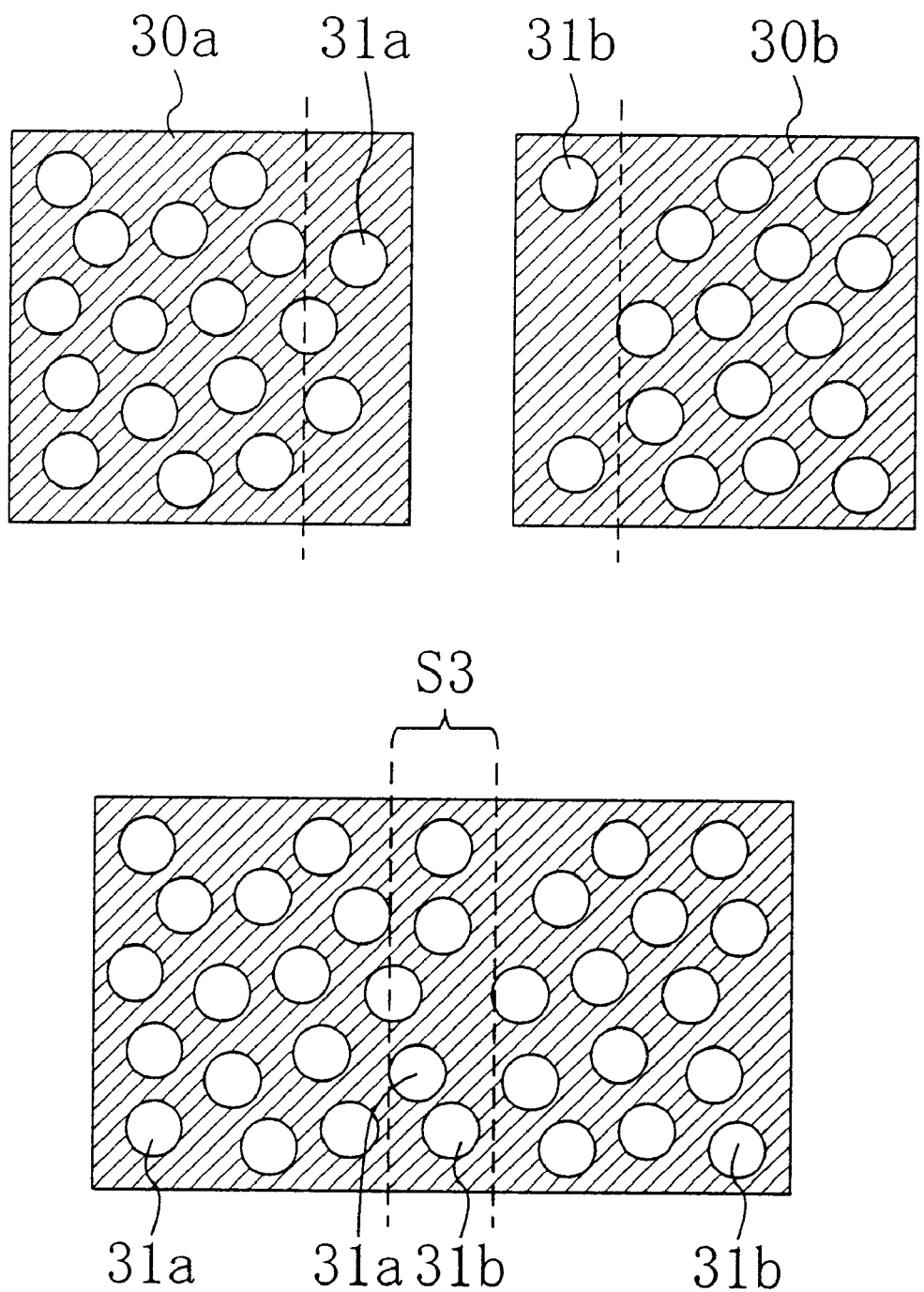
FIG. 8 is a plan view schematically illustrating a set of photomasks used in a fabrication method of the LCD of the embodiment of the present invention.

To avoid the double exposure, a set of photomasks 30a and 30b shown in FIG. 8 may be used. Using these photomasks, the surface profile of the third region R3 of the insulating layer 12 can be made nearly identical to that of the other regions. More concretely, light-transmitting spots 31a of the photomask 30a and light-transmitting spots 31b of the photomask 30b do not match with each other in the portion corresponding to the third region R3, and the same distribution (pattern) as that of the light-transmitting spots 31a or 31b in the other portion is obtained by combining the light-transmitting spots 31a and 31b of the photomasks 30a and 30b.

Figure 9:
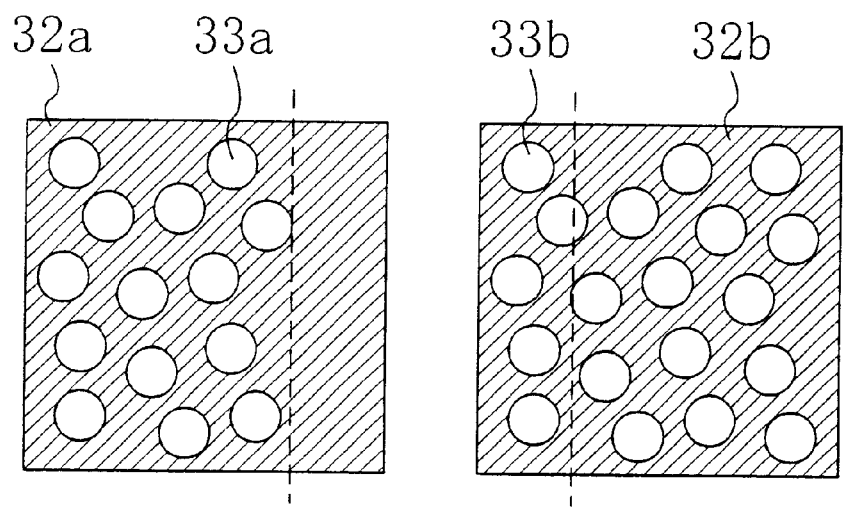
FIG. 9 is a plan view schematically illustrating another set of photomasks used in a fabrication method of the LCD of the embodiment of the present invention.
Figure 9:
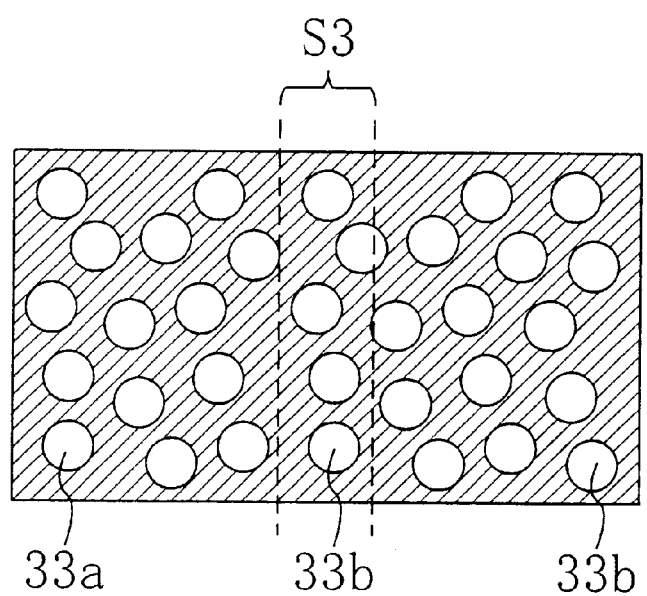

Alternatively, a set of photomasks 32a and 32b shown in FIG. 9 may be used. The photomask 32a has no light-transmitting spots 33a in the portion corresponding to the third region R3, while the photomask 32b has light-transmitting spots 33b formed at the same distribution as that in the other portion.

By use of any of the above sets of photomasks, the third region R3 of the photosensitive resin film is exposed to light only in one of the two exposure steps, allowing for forming substantially the same convex/concave profile as that of the other regions. In the case of using the photomasks 30a and 30b shown in FIG. 8, the reflection electrode 14 on the third region R3 will exhibit an intermediate reflection characteristic between those possessed by the reflection electrode 14 on the first region R1 and that on the second region R2. In the case of using the photomasks 32a and 32b shown in FIG. 9, the reflection electrode 14 on the third region R3 will exhibit the reflection characteristic possessed by the reflection electrode 14 on possessed by the reflection electrode 14 on either the first region R1 or the second region R2. The reflection electrode 14 on the thus-formed third region R3 exhibits the diffuse reflection characteristic more similar to that of the reflection electrode 14 on the first region R1 or the second region R2 than the reflection electrode 14 on the third region R3 formed via two exposure steps does. The seam portion is therefore less visible in the former case. This method using photomasks having complementary patterns for forming the third region R3 is also applicable to the half exposure of the photosensitive resin film.

When the present invention is applied to an LCD where reflection electrodes are formed on a TFT substrate, the inter-column spaces V may be formed at any positions with respect to bus lines including scanning lines (gate signal lines) and signal lines (source signal lines). Preferably, the inter-column spaces V may be formed so as to overlap with the bus lines. This arrangement advantageously reduces the area of the overlap between the reflection electrode and the bus line, which in turn reduces the capacitance formed between the reflection electrode and the bus line, thereby improving the display quality.

In the above description of the present invention, the reflection LCD having a reflection region over the entire pixel was exemplified. Substantially the same effects can also be obtained by applying the present invention to a combination type LCD where each pixel is divided into a transmission region (for transmission-mode display) and a reflection region (for reflection-mode display) and a semi-transmission LCD using semi-transmission (semi-transparent) electrodes. In particular, the seam portions can be made less visible most effectively in a combination type LCD that has a transmission region in the inner area of each pixel and a reflection region in the outer area thereof.

A light-shading pattern (so-called black matrix) may be formed on the counter substrate (substrate having no reflection electrodes) along portions corresponding to the inter-column spaces V. This makes the seam portions less visible more effectively.

Hereinafter, embodiments of the liquid crystal display device of the present invention will be described in a more concrete manner.

Embodiment 1

Figure 10:
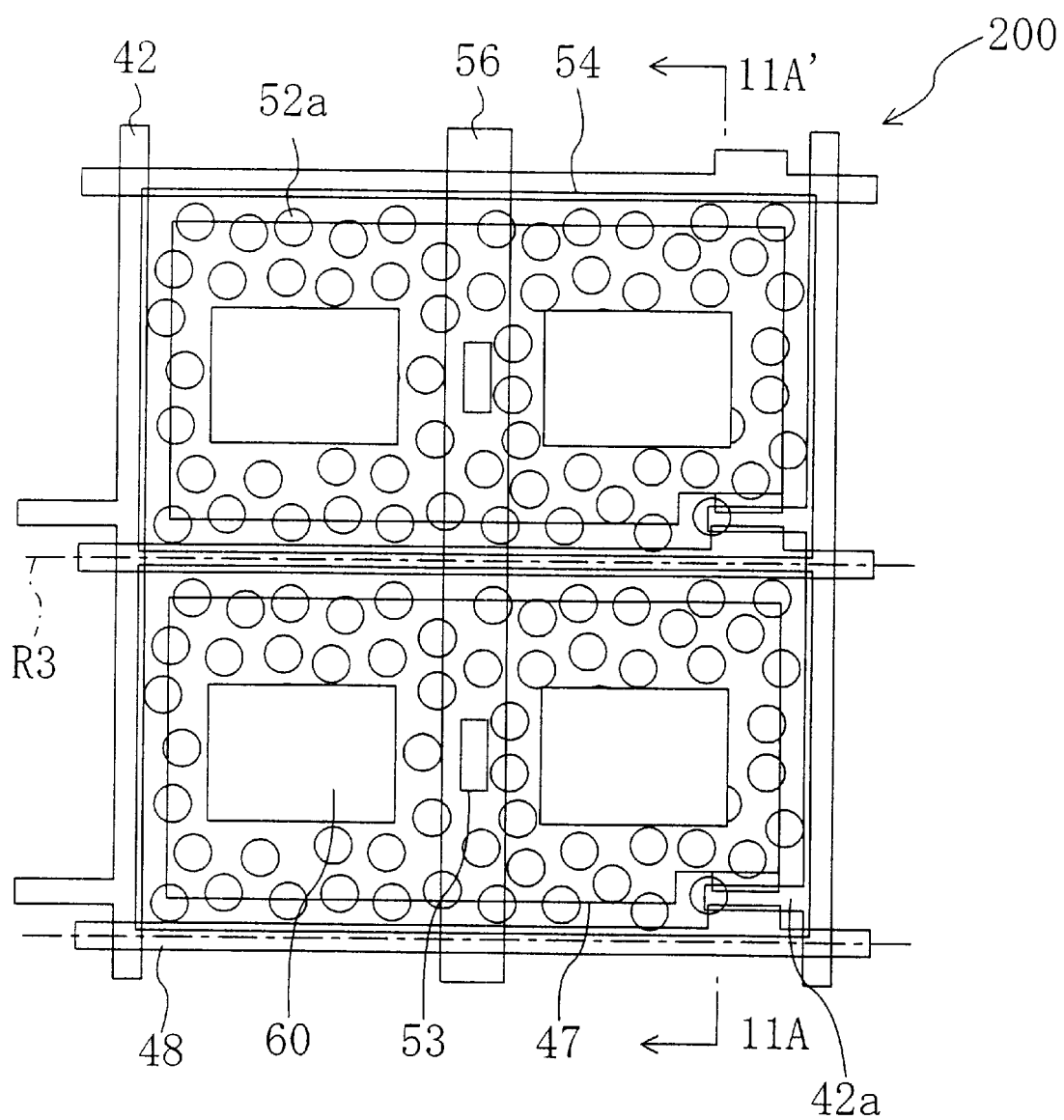
FIG. 10 is a schematic plan view of a transmission/reflection combination type LCD of EMBODIMENT 1 of the present invents.
Figure 11:
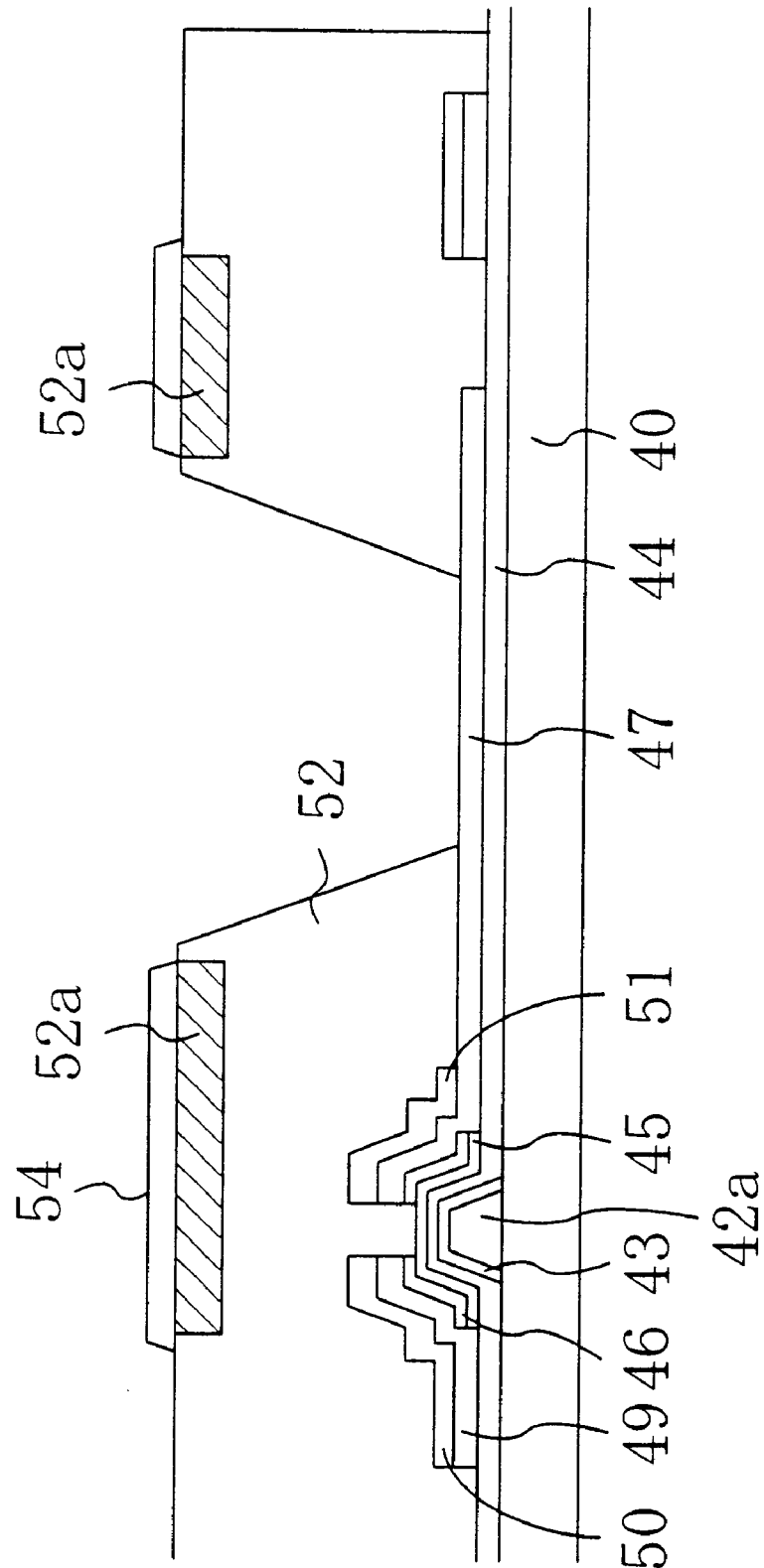
FIG. 11 is a schematic cross-sectional view of the LCD of FIG. 10.

FIG. 10 is a plan view of a transmission/reflection combination type LCD 200 of EMBODIMENT 1 of the present invention. FIG. 11 is a cross-sectional view taken along line 11A–11A' of FIG. 10. FIGS. 12A through 12D are cross-sectional views schematically illustrating the fabrication steps of the combination type LCD 200.

The LCD 200 of EMBODIMENT 1 is fabricated in the following manner, for example.

Figure 12A:
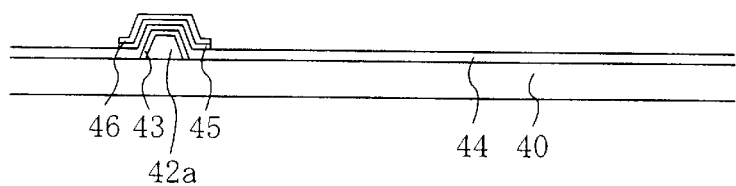
FIGS. 12A, 12B, 12C, and 12D are schematic cross-sectional views illustrating fabrication steps of the LCD of EMBODIMENT 1.

Referring to FIG. 12A, a metal thin film made of Al, Mo, Ta, or the like is formed on a glass substrate 40 by sputtering. Optionally, an insulating film made of $Ta_2O_5$, $SiO_2$, or the like may be formed on the glass substrate 40 as a base coat film.

The metal thin film is then patterned to form gate signal lines 42 and gate electrodes 42a (FIG. 10). During this patterning, storage capacitor signal lines 56 (FIG. 10) are formed simultaneously. The gate signal lines 42 and the gate electrodes 42a are then anodized for enhancing the insulation property, to form gate anodized films 43. An $SiN_x$ film is then deposited on the anodized gate signal lines 42 and gate electrodes 42a by P-CVD to a thickness of about 300 nm, to form a gate insulating film 44. On the gate insulating film 44 are formed a semiconductor layer 45 (made of amorphous Si) and an electrode contact layer 46 (made of amorphous Si or microcrystalline Si doped with impurities such as phosphorus) sequentially to a thickness of 150 nm and 50 nm, respectively. The resultant semiconductor layer 45 and electrode contact layer 46 are then patterned by dry etching with a mixed gas of HCl and $SF_6$.

Subsequently, referring to FIG. 12B, a transparent conductive film made of ITO is deposited by sputtering to a thickness of 150 nm, which will be patterned at a later stage to form transparent electrodes 47 for pixel regions. A metal film made of Al, Mo, Ta, or the like is then deposited by sputtering and patterned so as not to overlap the transparent electrodes 47 in the pixel regions, to form source signal lines 48 (FIG. 10), source electrodes 50, and drain electrodes 51. Thereafter, the above-mentioned transparent conductive film is patterned to form the source signal lines 48, source lines 49, and the transparent electrodes 47. Thus, the source signal lines 48, the source lines 49 (branches of the source signal lines), and the source electrodes 50 (electrodes formed over source regions of thin film transistors (TFTs)) are of a double-layer structure composed of the ITO layer and the metal layer. Alternatively, they may be integrally formed of a single conductive layer. The electrode contact layers 46 are then patterned by dry etching to form channels of the TFTs.

Figure 12B:
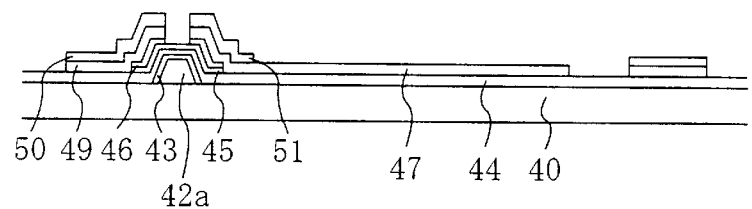
Figure 12C:
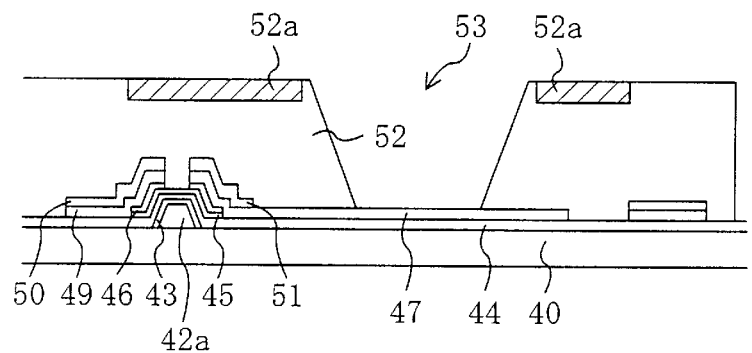

Referring to FIG. 12C, a photosensitive resin is applied to the resultant substrate, which is then subjected to light exposure, development, and heat treatment, thereby to form an interlayer insulating film 52 (which is in some cases simply called as an insulating film) having a thickness in the range of 1000 nm to 4000 nm.

The portions of the interlayer insulating film 52 corresponding to contact holes 53 and transmission regions 60 shown in FIG. 10 are removed. A convex/concave 52a is formed on the surface of the interlayer insulating film 52 other than the portions corresponding to the bus lines for improving the reflection characteristic. For example, the convex portions have a shape of a circle having a diameter of about 4 to 30 μm as is viewed in the direction normal to the substrate plane, and arranged randomly in the substrate plane. Such convex portions are formed using a photomask where circular light-shading spots (or light-transmitting spots) having a diameter of about 4 to 30 μm are arranged randomly and the distance between the nearest circles is in the range of about 1 to 5 μm.

The process of forming the convex/concave pattern on the interlayer insulating film 52 in the reflection regions in the pixel regions will be described with reference to FIGS. 13A through 13D.

Figure 13A:
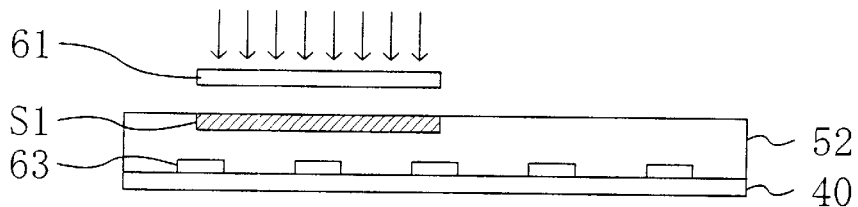
FIGS. 13A, 13B, 13C, and 13D are schematic cross-sectional views illustrating steps for forming an interlayer insulating film having a convex/concave surface of the LCD of EMBODIMENT 1.

Referring to FIG. 13A, a photomask 61 having circular light-shading spots arranged randomly (if the above-mentioned photosensitive resin is positive) is placed in parallel with the glass substrate 40 for the first light exposure. In this embodiment, in the first light exposure for a first exposure section S1, an end of the exposure section S1 is aligned to be located above the bus line 63.

Figure 13B:
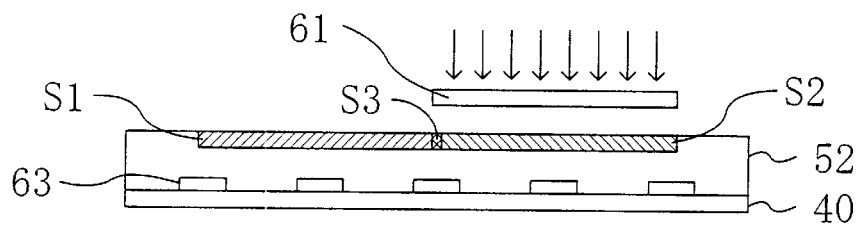

Referring to FIG. 13B, the photomask 61 is shifted to a position for the second light exposure so that a second exposure section S2 continuously follows the first exposure section S1. In the second light exposure, also, an end of the second exposure section S2 is aligned to be located above the bus line 63, so that a pattern seam portion S3 between the first and second exposure sections S1 and S2 is located above the bus line 63. The third and subsequent light exposure steps may be performed similarly as required.

Figure 13C:
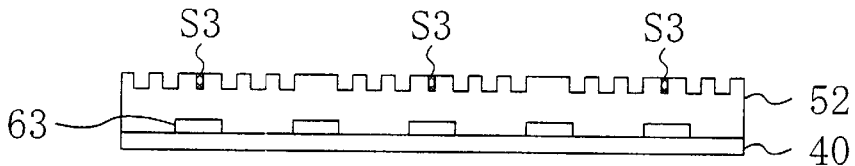
Figure 13D:
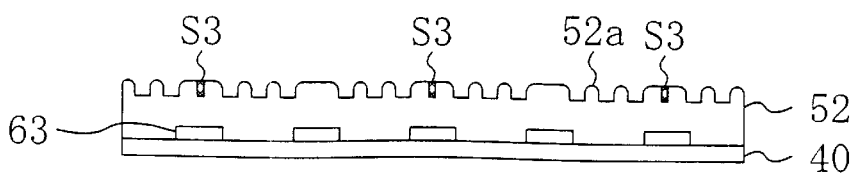

Referring to FIG. 13C, the exposed surface is then developed to form the convex/concave having circular convex portions at predetermined positions. Referring to FIG. 13D, the resultant substrate is heat-treated to smooth the convex/concave by melting and then thermally cured to obtain the optimum convex/concave 52a.

Thus, in EMBODIMENT 1, the patterning is made so that the pattern seam portions S3 (corresponding to the boundary portions S3 for exposure and the third regions R3) are located above the bus lines 63 where the convex/concave 52a is not formed. This makes the seam portions S3 less conspicuous.

Figure 12D:
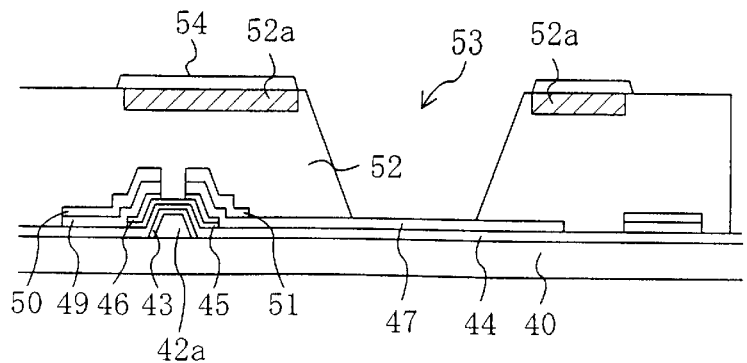

Thereafter, referring to FIG. 12D, a reflector film is formed on the resultant glass substrate 40 having the convex/concave pattern by sputtering. In this embodiment, an Al/Mo layered film having a thickness of 100 nm/50 nm was formed as the reflector film.

The Al/Mo layers of the reflector film were simultaneously etched with an etchant composed of nitric acid, acetic acid, phosphoric acid, and water to form reflection electrodes 54. In this way, formation of the TFTs and pixel regions of the LCD 200 of EMBODIMENT 1 is completed.

The resultant substrate is then subjected to a known LCD fabrication process, including application of alignment films, bonding with the counter substrate, and injection of a liquid crystal material. Then, a backlight is disposed on the rear side, to finally complete the transmission/reflection combination type LCD 200.

The resultant LCD 200 was subjected to a display test, and found to exhibit uniform display with no variation in reflection characteristic over the entire panel and the seam portions between exposure shots being made inconspicuous.

Embodiment 2

Figure 14:
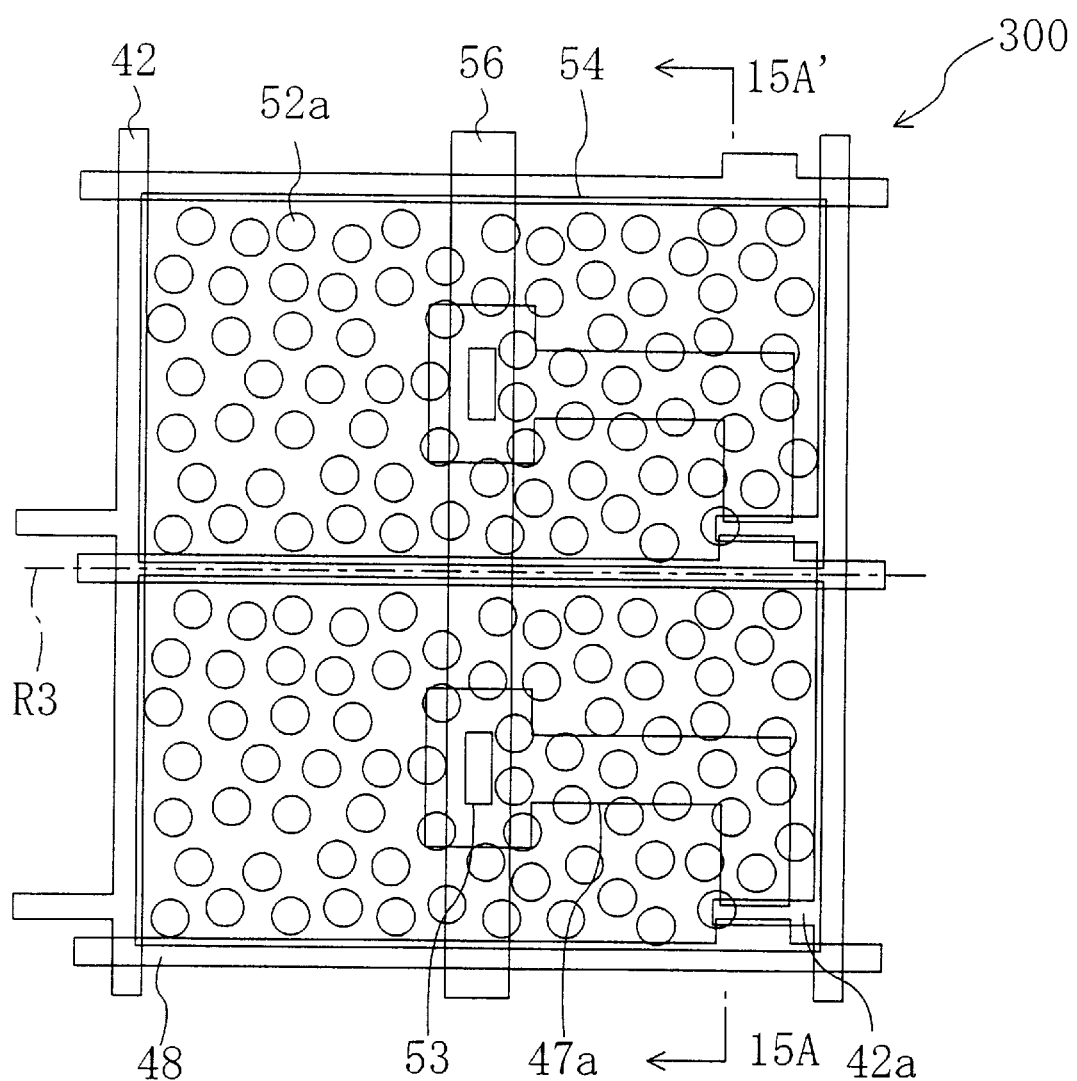
FIG. 14 is a schematic plan view of a reflection LCD of EMBODIMENT 2 of the present invention.
Figure 15:
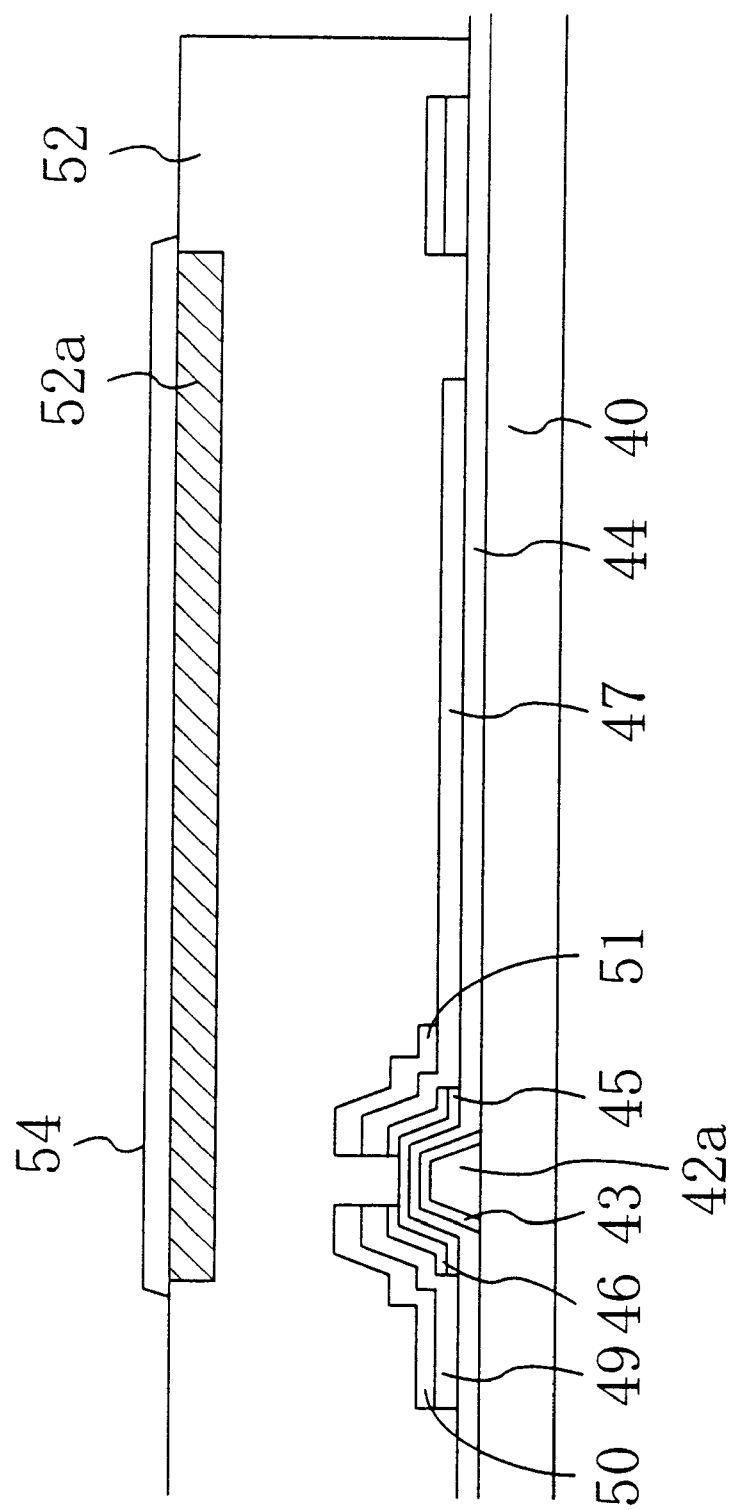
FIG. 15 is a schematic cross-sectional view of the LCD of FIG. 14.

FIG. 14 is a plan view of a reflection LCD 300 of EMBODIMENT 2 of the present invention. FIG. 15 is a cross-sectional view taken along line 15A–15A' of FIG. 14.

As shown in FIGS. 14 and 15, TFTs are formed on a glass substrate 40 and an interlayer insulating film 52 is formed on the resultant substrate in the manner described in EMBODIMENT 1. The portions of the interlayer insulating film 52 corresponding to contact holes 53 are removed. A convex/concave 52a is formed on the surface of the interlayer insulating film 52 other than the portions corresponding to bus lines (gate signal lines 42 and source signal lines 48).

The process of forming the convex/concave pattern on the interlayer insulating film 52 in the reflection regions in the pixel regions is substantially the same as that described in EMBODIMENT 1. That is, the patterning is made so that a pattern seam portion S3 at the boundary between the first exposure section and the second exposure section is located above the bus line 63.

Thus, in this embodiment, as in EMBODIMENT 1, the patterning is made so that the pattern seam portions S3 are located above the bus lines 63 where the convex/concave 52a is not formed. This makes the seam portions S3 inconspicuous.

Reflection electrodes 54 are then formed on the resultant substrate, and thus formation of TFTs and pixel regions of the LCD 300 of EMBODIMENT 2 is completed.

The resultant substrate is then subjected to a known LCD fabrication process, including application of alignment films, bonding with the counter substrate, and injection of a liquid crystal material, to finally complete the reflection LCD 300. The reflection electrodes 54 are coupled with connection electrodes 47a via the contact holes 53. The connection electrodes 47a are formed in substantially the same manner as the transparent electrodes 47 of the combination type LCD 200 of EMBODIMENT 1, and are coupled with the drain electrodes of the TFTs.

The resultant LCD 300 was subjected to a display test, and found to exhibit uniform display with no variation in reflection characteristic over the entire panel and the seam portions between exposure shots being made inconspicuous.

Embodiment 3

Figure 16:
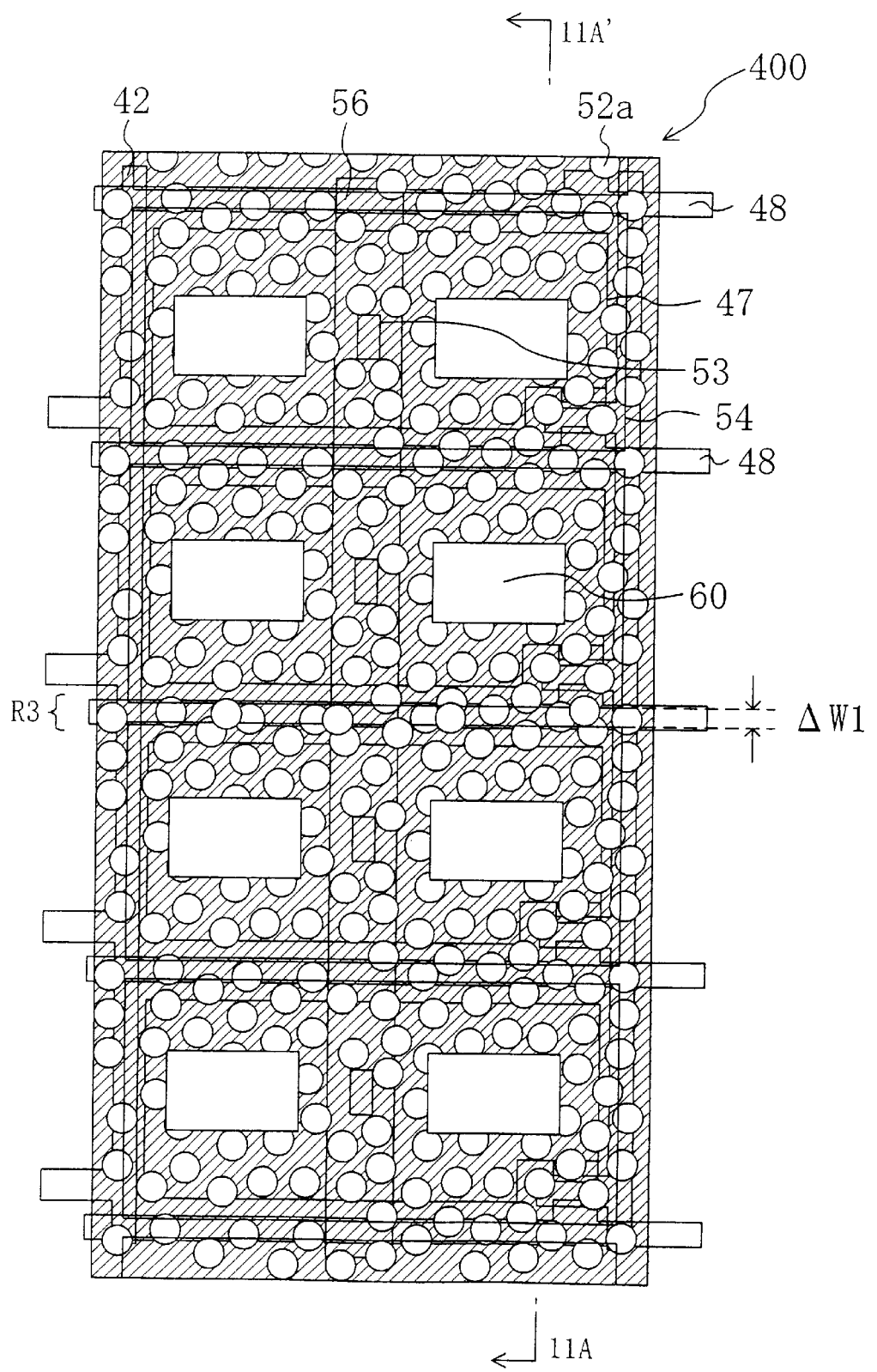
FIG. 16 is a schematic plan view of a transmission/reflection combination type LCD of EMBODIMENT 3 of the present invention.

FIG. 16 is a plan view of a transmission/reflection combination type LCD 400 of EMBODIMENT 3 of the present invention. The cross-section taken along line 11A–11A' of FIG. 16 is the same as that of FIG. 11, which is therefore omitted here.

The combination type LCD 400 of this embodiment can be fabricated in substantially the same manner as that described in EMBODIMENT 1 with reference to FIGS. 12A through 12D, except for the patterning of the photosensitive resin film. In this embodiment, the convex/concave is formed for the pattern seam portions (the boundary portions S3 for exposure and the third regions R3), as well as for the reflection regions. This will be described with reference to FIGS. 17A through 17D.

As in EMBODIMENT 1, after the steps shown in FIGS. 12A and 12B are performed, a photosensitive resin is applied to the resultant substrate as shown in FIG. 12C, which is then subjected to light exposure, development, and heat treatment, thereby to form an interlayer insulating film 52 having a thickness in the range of 1000 nm to 4000 nm. The portions of the interlayer insulating film 52 corresponding to contact holes 53 and transmission regions 60 shown in FIG. 16 are removed. A convex/concave 52a is formed on the surface of the interlayer insulating film 52 including the portions corresponding to the bus lines (for example, source signal lines 48) for improving the reflection characteristic.

The process of forming the convex/concave pattern on the interlayer insulating film 52 will be described with reference to FIGS. 17A through 17D.

Figure 17A:
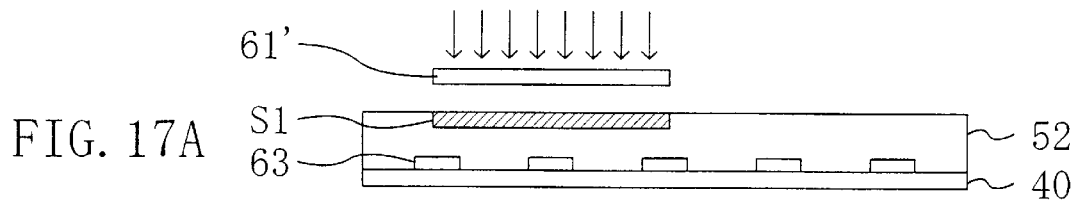
FIGS. 17A; 17B, 17C, and 17D are schematic cross-sectional views illustrating steps for forming an interlayer insulating film having a convex/concave surface of the LCD of EMBODIMENT 3.

Referring to FIG. 17A, a photomask 61' having circular light-shading spots arranged randomly is placed in parallel with the glass substrate 40 for the first light exposure. In this embodiment, in the first light exposure for a first exposure section S1, an end of the first exposure section S1 is aligned to be located above the bus line 63.

Figure 17B:
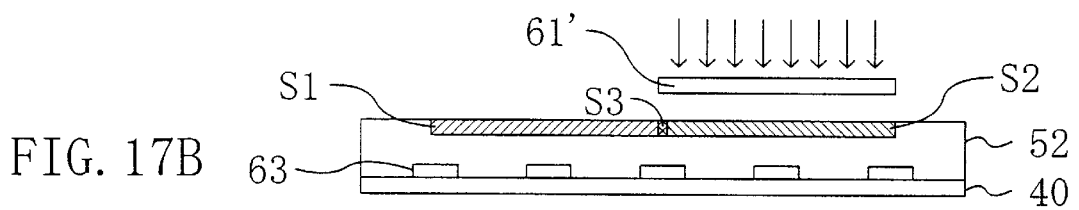

Referring to FIG. 17B, the photomask 61' is shifted to a position for the second light exposure so that a second exposure section S2 continuously follows the first exposure section S1. In the second light exposure, also, an end of the second exposure section S2 is aligned to be located above the bus line 63, so that a pattern seam portion S3 between the first and second exposure sections S1 and S2 is located above the bus line 63. The exposure sections S1 and S2 overlap with each other, and the width of the overlap portion, i.e., the pattern seam portion S3, is larger than the width $\Delta W1$ of the inter-column space V (see FIG. 16) and larger than the width of the bus line (source signal line 48). The third and subsequent light exposure steps may be made similarly as required.

Figure 17C:
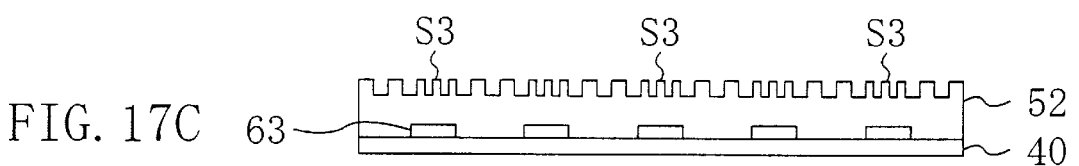
Figure 17D:
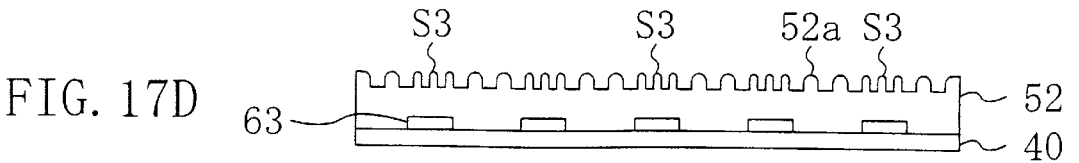

Referring to FIG. 17C, the exposed surface is developed to form the convex/concave 52a having circular convex portions at predetermined positions. Referring to FIG. 17D, the resultant substrate is heat-treated to smooth the convex/concave 52a by melting and then thermally cured to obtain the optimum convex/concave 52a.

Thereafter, as shown in FIG. 12D, a reflector film is formed on the resultant glass substrate 40 having the convex/concave pattern by sputtering. In this embodiment, an Al/Mo layered film having a thickness of 100 nm/50 nm was formed as the reflector film.

The Al/Mo layers of the reflector film were simultaneously etched with an etchant composed of nitric acid, acetic acid, phosphoric acid, and water to form reflection electrodes 54. Since the pattern seam portions S3 generated during the formation of the convex/concave profile are arranged to be located in the regions including spaces between the adjacent reflection electrodes 54, the pattern seam portions S3 are less conspicuous. In this way, the formation of the TFTs and pixel regions of the LCD 400 of EMBODIMENT 3 is completed.

Figure 18:
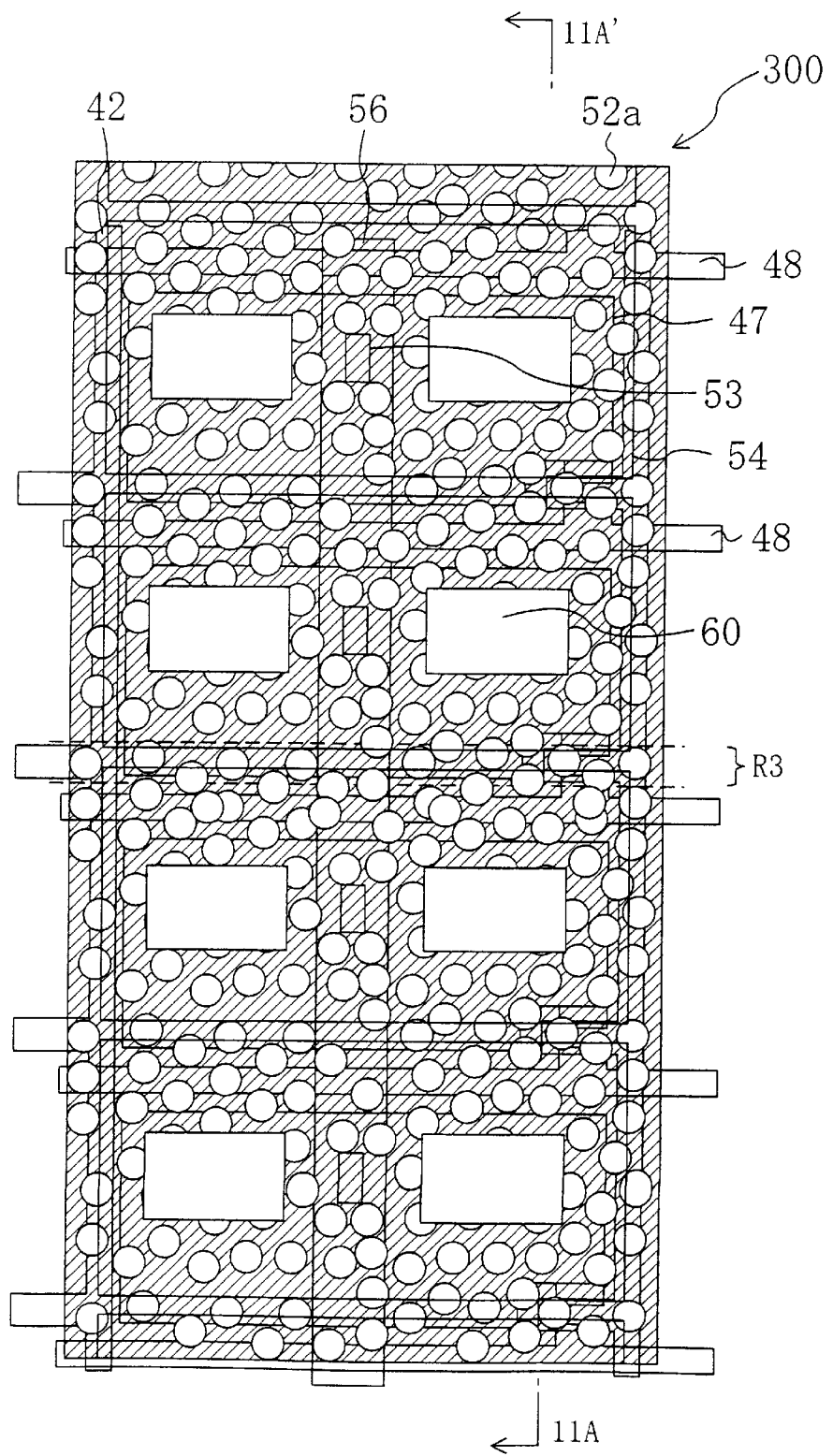
FIG. 18 is a schematic plan view of another transmission/reflection combination type LCD of EMBODIMENT 3 of the present invention.

In this embodiment, in order to reduce the capacitance between the bus lines and the reflection electrodes 54, the reflector film was patterned so that the spaces between the adjacent reflection electrodes 54 are located above the bus lines. Therefore, the patterning for the formation of the convex/concave profile was made so that the pattern seam portions S3 were located above the bus lines 63. Alternatively, in the case shown in FIG. 18, for example, where the spaces between the adjacent reflection electrodes 54 are not located above the bus lines, the patterning can be made so that the pattern seam portions R3 are located to correspond to the spaces between the adjacent reflection electrodes 54. By this patterning, the pattern seam portions R3 can be made less visible.

In the above construction, the following problem may occur. That is, the convex/concave pattern is different between the seam portion R3 and the inter-column space V that does not overlap with the seam portion R3. Therefore, in the construction where the seam portion R3 overlaps with part of the reflection electrode 54, the reflectance of the part of the reflection electrode 54 overlapping with the seam portion R3 is different from that of the other portions of the reflection electrode 54. This may result in making the seam portion R3 slightly observable.

Figure 19:
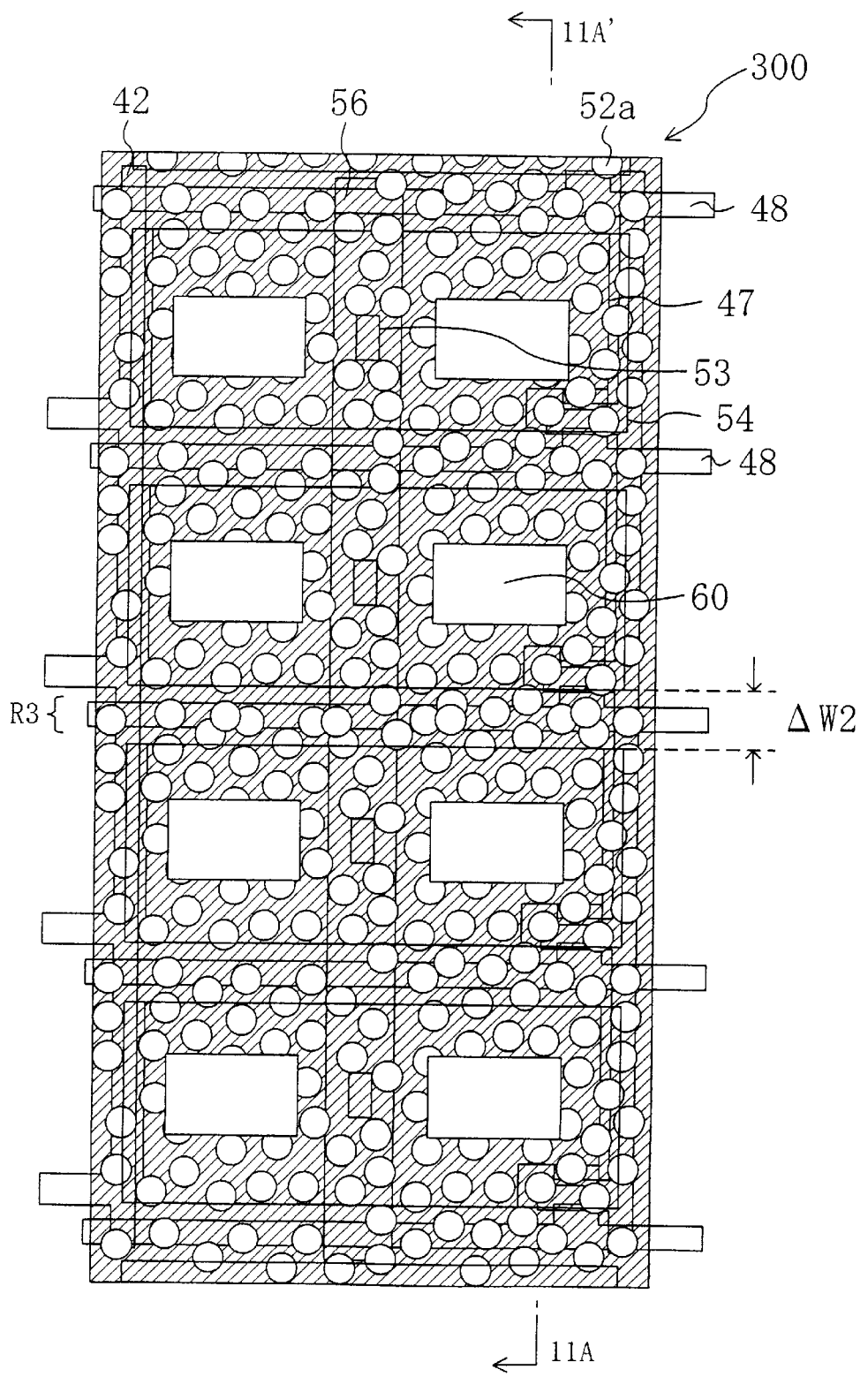
FIG. 19 is a schematic plan view of yet another transmission/reflection combination type LCD of EMBODIMENT 3 of the present invention.
Figure 20:
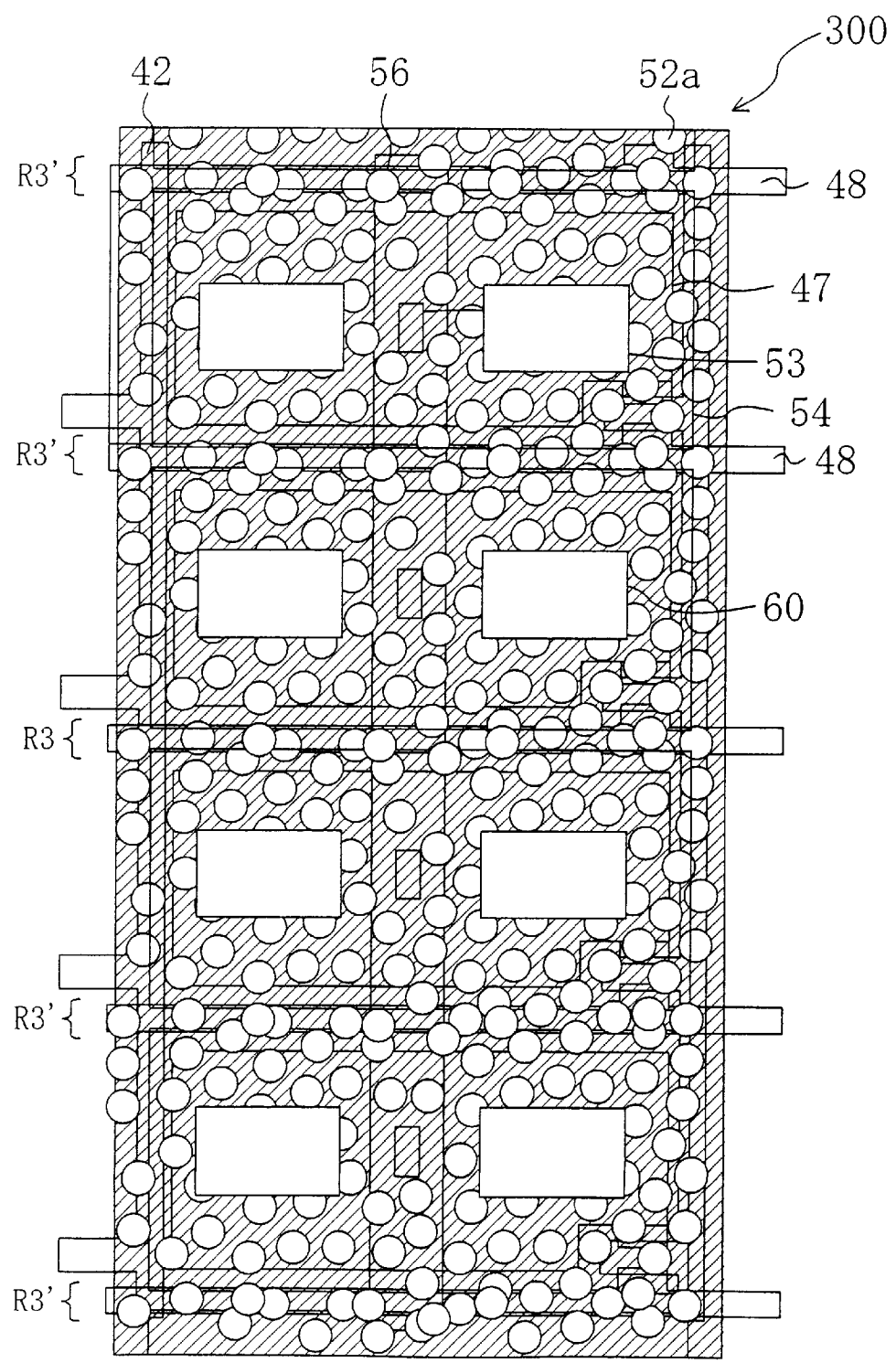
FIG. 20 is a schematic plan view of yet another transmission/reflection combination type LCD of EMBODIMENT 3 of the present invention.

In order to solve the above problem, the width (ΔW2) of the inter-column space V may be made larger than the width of the seam portion R3 as shown in FIG. 19 to make the seam portion R3 inconspicuous. The construction shown in FIG. 19 however reduces the area of the reflection electrode 54 and thus reduces the reflectance (display brightness) of the resultant LCD. As a solution to this problem, the construction shown in FIG. 20 may be adopted, where substantially the same profile as that of the seam portion R3 may be provided for the inter-column spaces V that do not overlap with the seam portion R3, forming virtual seam portions R3'. This construction succeeds in making the seam portion R3 less visible without lowering the reflectance.

Figure 21A:
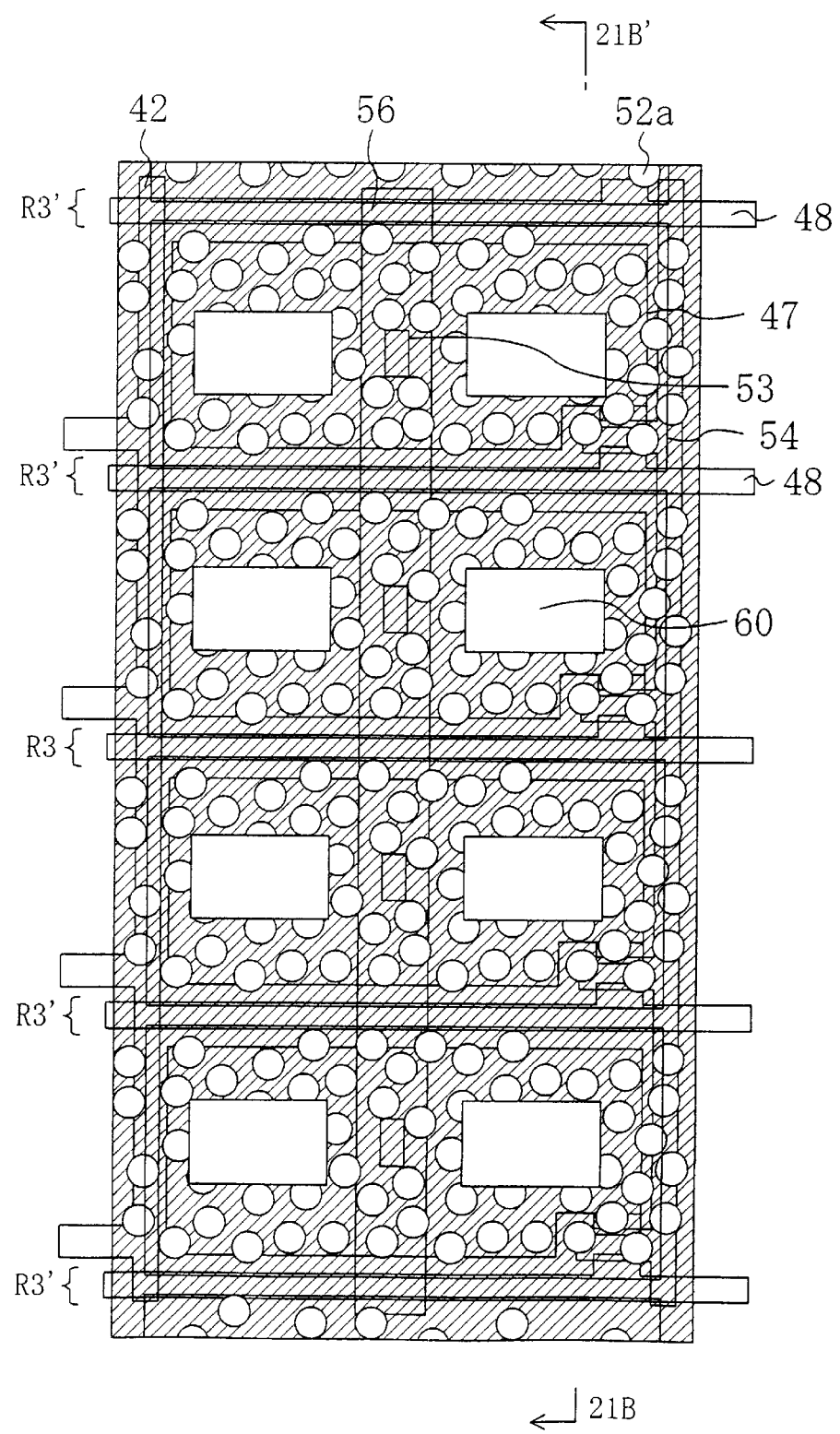
FIGS. 21A and 21B are a schematic plan view and a schematic cross-sectional view, respectively, of yet another transmission/reflection combination type LCD of EMBODIMENT 3 of the present invention.
Figure 21B:
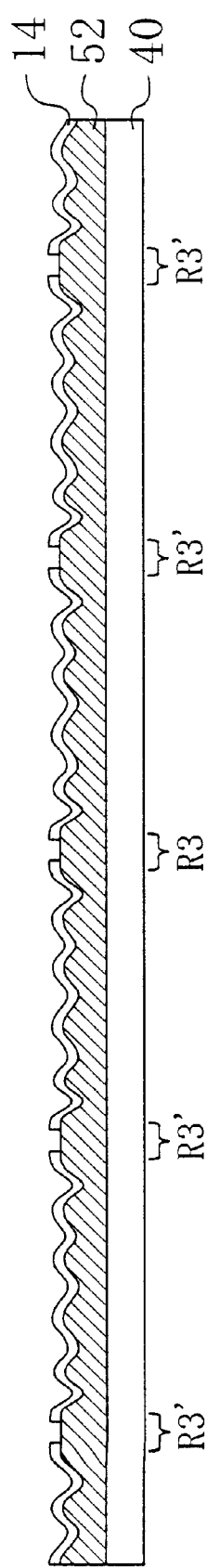

However, it is difficult to form a convex/concave profile on the interlayer insulating film without multiple exposure when the convex/concave profile is formed using the photomask 61 having a plurality of circular light-shading spots, in particular, when the convex/concave profile is formed with part of the interlayer insulating film in the thickness direction being left unremoved, not removing the interlayer insulating film to the full thickness. To overcome this problem, the construction shown in FIGS. 21A and 21B may be adopted. That is, the seam portion R3 and the virtual seam portions R3' (portions including the spaces between the adjacent reflection electrodes 54 where the seam portion R3 does not exist) are not exposed to light, or exposed to light having a uniform intensity distribution, so as to have a flat surface. Thus, the surface profiles of the seam portion R3 and the virtual seam portions R3' are made roughly the same. In addition, flat surfaces return specular reflection, which less contributes to display. As a result, the seam portion R3 is less visible even if the reflection electrode 54 is formed on the flat surface.

It is also possible to form the convex/concave profile using the sets of photomasks shown in FIGS. 8 and 9 to avoid the pattern seam portion S3 of the photosensitive resin film from being double exposed to light. By using such photomasks, the reflection characteristic at the seam portion R3 and that at the virtual seam portions R3' can be made nearly identical to each other, while the reflection electrodes 54 are provided with the diffuse reflection characteristic.

Figure 22:
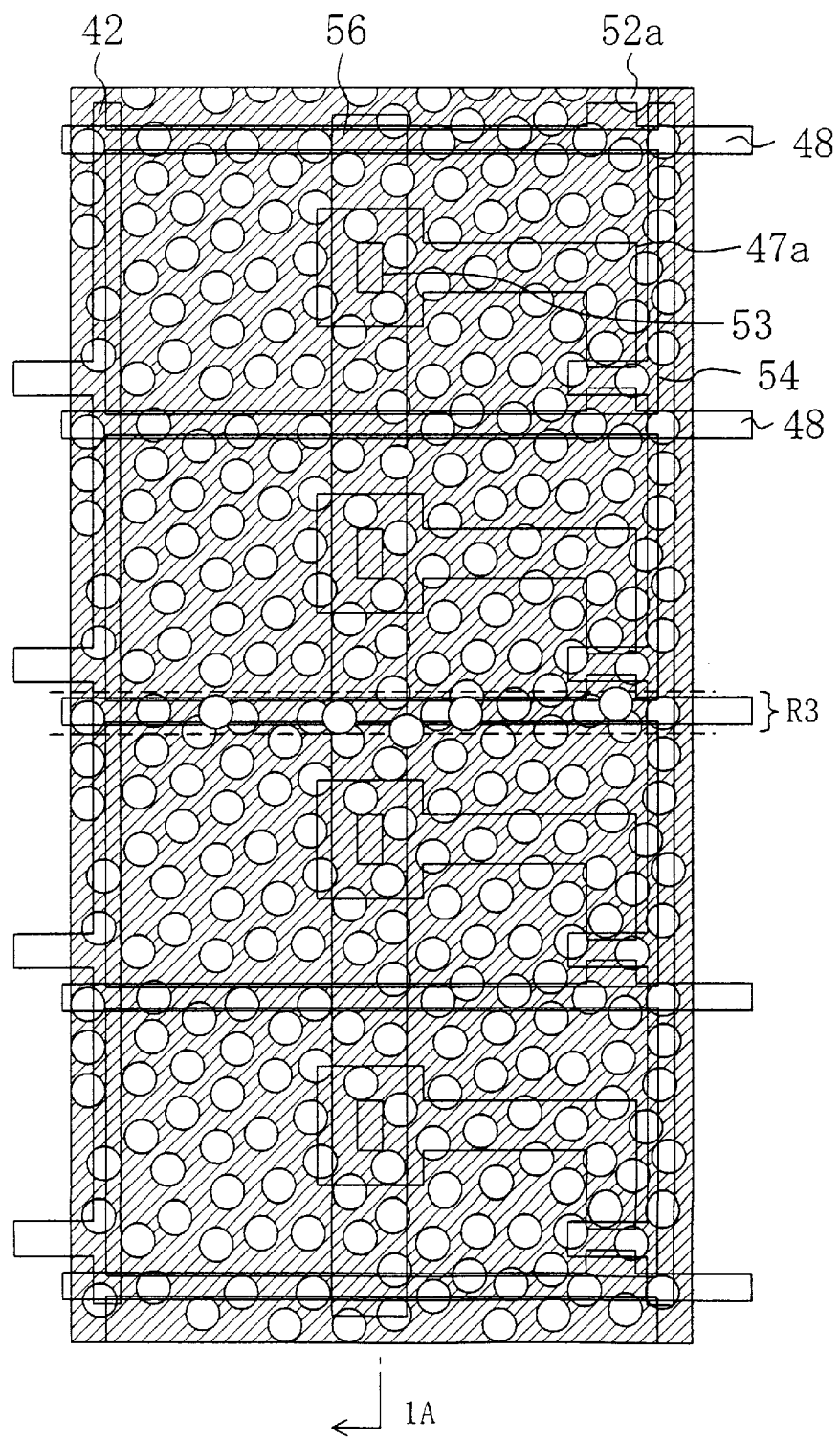
FIG. 22 is a schematic plan view of a reflection LCD of EMBODIMENT 3 of the present invention.
Figure 23A:
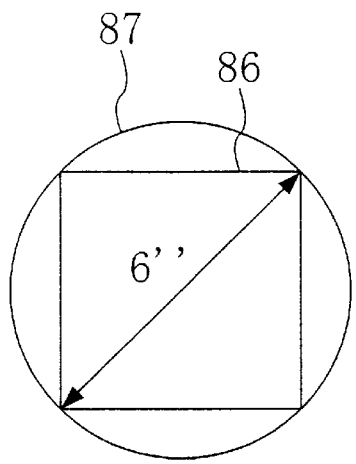
FIGS. 23A and 23B are schematic views illustrating regions that can be exposed by a stepper at one shot and at two shots (division exposure), respectively.
Figure 23B:
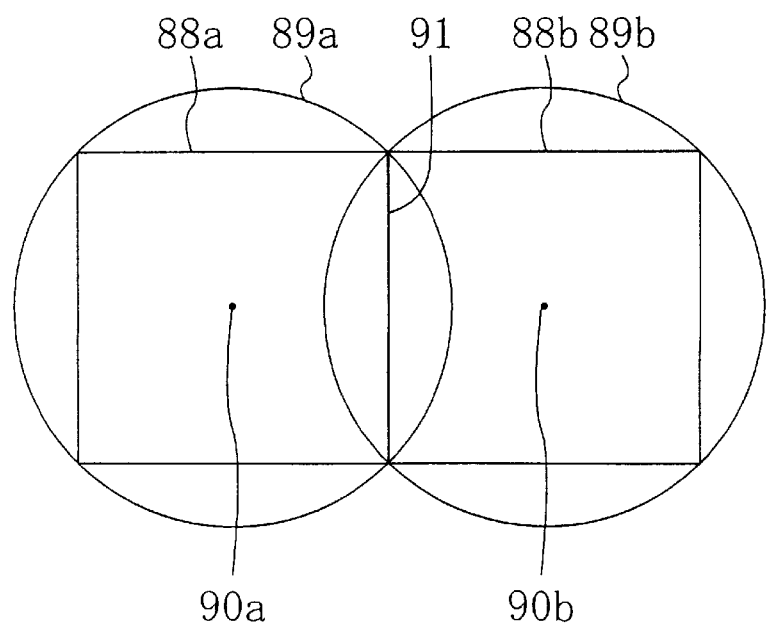
Figure 24:
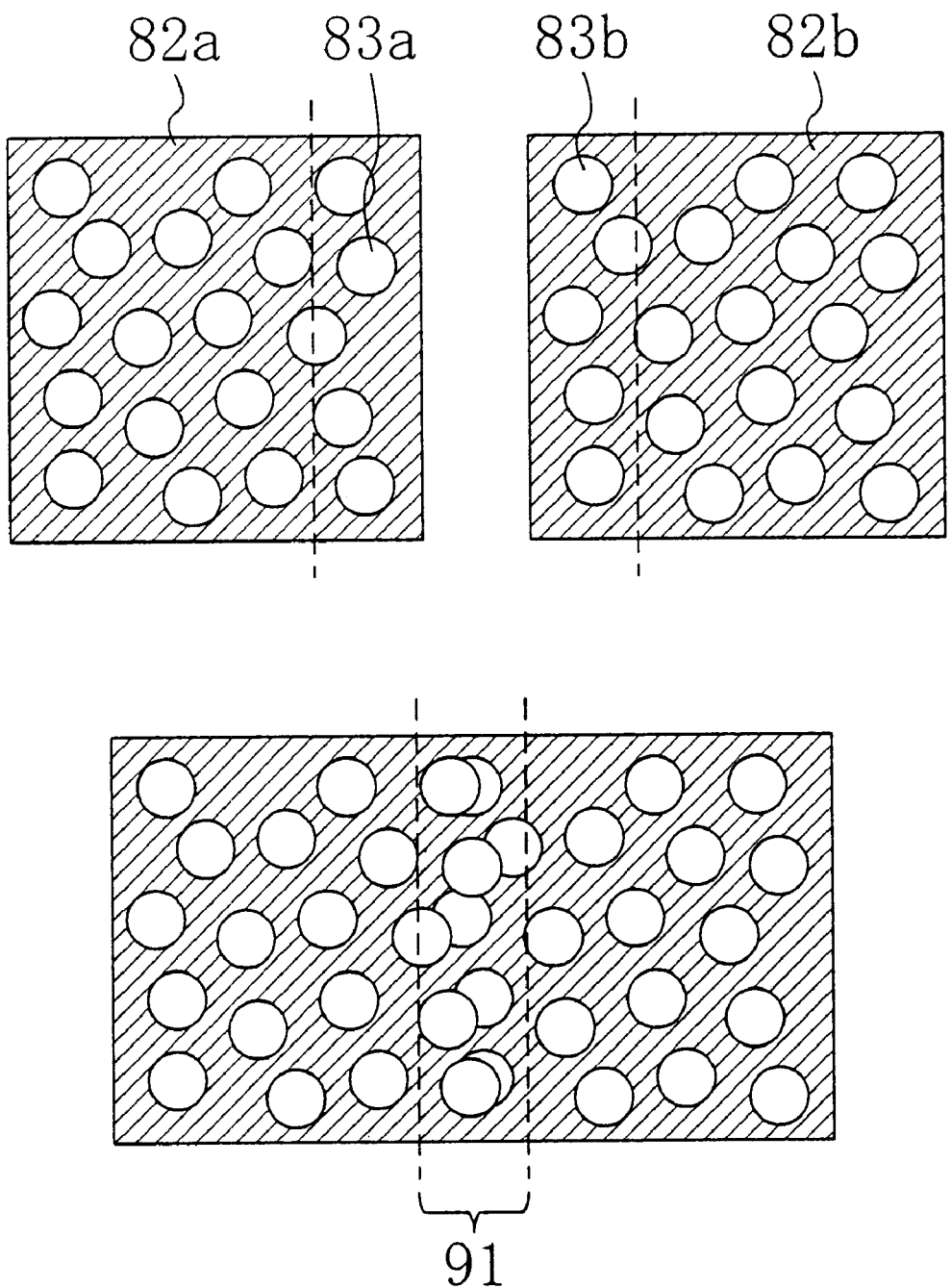
FIG. 24 is a schematic view for presenting a problem in a general division exposure process.
Figure 25:
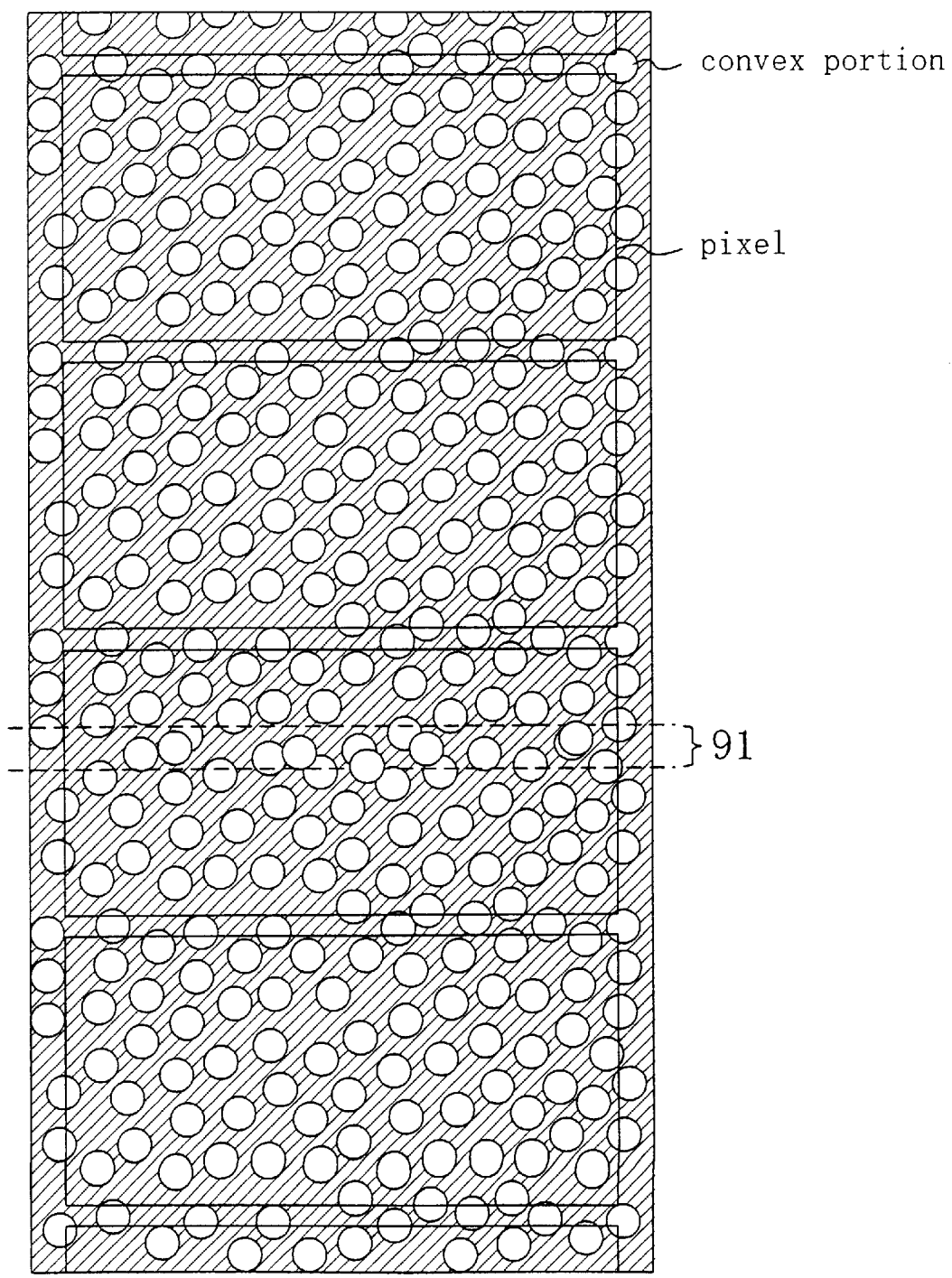
FIG. 25 is a schematic view illustrating arrangement of a seam portion generated by the division exposure.

In this embodiment, the present invention was applied to the transmission/reflection combination type LCD where each pixel electrode was divided into the transmission region and the reflection region. Alternatively, the present invention may also be applied to a reflection LCD as shown in FIG. 22 or a semi-transmission LCD. In both cases, substantially the same effects can be obtained.

The virtual seam portions R3' are not necessarily formed for all the inter-column spaces V, but may be formed every three pixel columns, for example. The virtual seam portions R3' of the interlayer insulating film may have both the concave/convex profile and the flat profile in a mixed fashion.

In the above embodiments, the interlayer insulating film having a convex/concave surface was made of a single-layer photosensitive resin film. Alternatively, an additional resin layer (photosensitive or non-photosensitive) may be applied to the patterned photosensitive resin film.

Thus, according to the present invention, there are provided the liquid crystal display device permitting reflection-mode display that has good productivity and minimizes the lowering in display quality due to seam portions generated by division exposure, and the method for fabricating such a liquid crystal display device. The present invention is suitably applied to a reflection LCD, a transmission/reflection combination type LCD, and a semi-transmission LCD.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A method for fabricating a liquid crystal display device including a plurality of pixels arranged in a matrix constituting a plurality of pixel columns, each of the plurality of pixels having a reflection region permitting reflection-mode display, the reflection region including an insulating layer having a convex/concave surface and a reflector formed on the convex/concave surface of the insulating layer, the method comprising the step of forming the insulating layer having the convex/concave surface, the step of forming the insulating layer comprising the steps of:

forming a photosensitive resin film;

exposing a first region of the photosensitive region film via a first photomask (first exposure step);

exposing a second region of the photosensitive region film that includes a region different from the first region via a second photomask (second exposure step); and developing the exposed photosensitive resin film, wherein the first and second exposure steps are performed so that a boundary portion defined as an overlap between the first region and the second region or a space between the first region and the second region is located to overlap with at least part of an inter-column space between adjacent pixel columns among the plurality of pixel columns.

2. The method of claim 1, wherein the first and second exposure steps are performed so that the boundary portion overlaps with the inter-column space and part of the reflection regions of the pixels on both sides of the inter-column space.

3. The method of claim 1, wherein the first and second exposure steps are performed so that the boundary portion is located to be within the range of the inter-column space.

4. The method of claim 1, wherein, in the first and second exposure steps, a pattern via which the boundary portion of the photosensitive resin film is exposed to light is the same as a pattern via which portions of the photosensitive resin film corresponding to the inter-column spaces other than the inter-column space corresponding to the boundary portion.

5. The method of claim 4, wherein, in the first and second exposure steps, the portions of the photosensitive resin film corresponding to the inter-column spaces are exposed to light having a substantially uniform intensity distribution.

6. The method of claim 1, wherein, in the first and second exposure steps, the boundary portion of the photosensitive resin film and the portions of the photosensitive resin film corresponding to the inter-column spaces other than the inter-column space corresponding to the boundary portion are substantially not exposed to light.

7. The method of claim 4, wherein the portions of the photosensitive resin film corresponding to all the inter-column spaces formed by the plurality of pixels are removed.

8. The method of claim 1, wherein the first and second exposure steps are performed so that the boundary portion of the photosensitive resin film is not double exposed to light.

9. A liquid crystal display device comprising a plurality of pixels arranged in a matrix constituting a plurality of pixel columns, each of the plurality of pixels having a reflection region permitting reflection-mode display, the reflection region including an insulating layer having a convex/concave surface and a reflector formed on the convex/concave surface of the insulating layer, wherein the insulating layer includes: a first region allowing the overlying reflector to exhibit a first reflection characteristic; a second region allowing the overlying reflector to exhibit a second reflection characteristic; and a third region formed between the first region and the second region, and the third region is located to overlap with at least part of an inter-column space between adjacent pixel columns among the plurality of pixel columns.

10. The device of claim 9, wherein the third region overlaps with the inter-column space and part of the reflection regions of the pixels on both sides of the inter-column space.

11. The device of claim 9, wherein the third region is located to be within the range of the inter-column space.

12. The device of claim 9, wherein a portion of the insulating layer corresponding to the at least part of the inter-column space overlapping with the third region has the same convex/concave profile as a portion of the insulating layer corresponding to the inter-column space that does not overlap with the third region.

13. The device of claim 9, wherein the third region of the insulating layer has a substantially flat surface.

14. The device of claim 9, wherein at least part of the insulating layer corresponding to all the inter-column spaces formed by the plurality of pixels has been removed.

15. The device of claim 9, further comprising: switching elements provided for the respective plurality of pixels; scanning lines for applying a scanning signal to the switching elements; and signal lines provided to intersect with the scanning lines for applying a display signal to the switching elements, wherein the scanning lines and the signal lines run between the plurality of pixels.

* * * * *